United States Patent
Hosseini et al.

(10) Patent No.: US 11,425,737 B2
(45) Date of Patent: Aug. 23, 2022

(54) GROUP SIGNALING FOR ULTRA-RELIABLE LOW-LATENCY COMMUNICATIONS

(71) Applicant: QUALCOMM Incorporated, San Diego, CA (US)

(72) Inventors: Seyedkianoush Hosseini, San Diego, CA (US); Chih-Ping Li, San Diego, CA (US); Wanshi Chen, San Diego, CA (US); Jing Jiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 9 days.

(21) Appl. No.: 16/532,826

(22) Filed: Aug. 6, 2019

(65) Prior Publication Data

US 2020/0053744 A1 Feb. 13, 2020

Related U.S. Application Data

(60) Provisional application No. 62/717,315, filed on Aug. 10, 2018.

(51) Int. Cl.
*H04W 72/04* (2009.01)
*H04W 72/12* (2009.01)
(Continued)

(52) U.S. Cl.
CPC ......... *H04W 72/121* (2013.01); *H04L 5/0003* (2013.01); *H04L 5/005* (2013.01); *H04W 28/06* (2013.01); *H04W 28/10* (2013.01); *H04W 72/1289* (2013.01); *H04W 76/18* (2018.02); *H04W 80/10* (2013.01)

(58) Field of Classification Search
None
See application file for complete search history.

(56) References Cited

U.S. PATENT DOCUMENTS

2017/0332358 A1   11/2017   Park et al.
2017/0353273 A1   12/2017   Zhang et al.

OTHER PUBLICATIONS

Nokia et al., "SPS Design Considerations", 3GPP Draft; R1-1608894_SPS_DESIGN_CONSIDERATIONS, 3rd Generation Partnership Project (3GPP), Mobile Competence Centre, 650, Route Des Lucioles, F-06921, Sophia-Antipolis Cedex, France, vol. RAN WG1, No. Lisbon, Portugal; Oct. 10, 2016-Oct. 14, 2016 Oct. 9, 2016, XP051148948, Retrieved from the Internet: URL:http://www.3gpp.org/ftp/Meetings_3GPP_SYNC/RAN1/Docs/ [retrieved on Oct. 9, 2016], 4 pages.

(Continued)

*Primary Examiner* — Willie J Daniel, Jr.
(74) *Attorney, Agent, or Firm* — Qualcomm Incorporated

(57) ABSTRACT

A wireless communications system may support a large number of user equipment (UEs) and a base station may transmit resource configuration information to a group of UEs, in which the configuration information identifies the group of UEs. In some cases, the base station may receive a data transmission from a UE of the UE group that the base station cannot decode. The base station may then transmit a group-common feedback signal to the UE group. Once the transmitting UE of the UE group receives the group-common signal, the UE may re-transmit the data to the base station. By sending a group-common feedback signal, the base station may conserve resources, improve reliability and increase successful uplink transmissions from UEs.

52 Claims, 15 Drawing Sheets

(51) Int. Cl.
*H04L 5/00* (2006.01)
*H04W 28/10* (2009.01)
*H04W 80/10* (2009.01)
*H04W 76/18* (2018.01)
*H04W 28/06* (2009.01)

(56) References Cited

OTHER PUBLICATIONS

Partial International Search Report—PCT/US2019/045539—ISA/EPO—dated Nov. 20, 2019.
International Search Report and Written Opinion—PCT/US2019/045539—ISA/EPO—dated Jan. 27, 2020.

GROUP SIGNALING FOR ULTRA-RELIABLE LOW-LATENCY COMMUNICATIONS

CROSS REFERENCE

The present Application for Patent claims the benefit of U.S. Provisional Patent Application No. 62/717,315 by HOSSEINI, et al., entitled "GROUP SIGNALING FOR ULTRA-RELIABLE LOW-LATENCY COMMUNICATIONS," filed Aug. 10, 2018, assigned to the assignee hereof, and expressly incorporated by reference herein.

BACKGROUND

The following relates generally to wireless communications, and more specifically to group signaling for ultra-reliable low-latency communications (URLLC).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Generally, a set of resources may be configured for a UE group. The resources may be configured on a per transmission time interval (TTI) basis. An example of such group resource configurations may include configurations for semi-persistent scheduling (SPS). For example, multiple UEs within a UE group may be configured, via a configured grant, to transmit on shared resources. While the specific resources allocated to each UE for each transmission may change (due to hopping, for example), UEs within the group of UEs may likely have at least some overlapping transmissions on shared resources. As a result, multiple UE transmissions from UEs in the UE group may collide. In the event of a collision, the base station may detect which UEs transmitted data even though the corresponding data may not have been successfully received by the base station. In the case of detection, a base station may attempt to remedy the collisions by sending grants to each of the UEs whose uplink transmissions were not successfully received by the base station. In some examples, the base station may send a separate grant to each of the detected UEs. However, sending individual uplink grants to each involved UE for re-transmissions could be costly and cause latency and reliability issues.

SUMMARY

Generally, the described techniques relate to improved methods, systems, devices, and apparatuses that support group signaling for ultra-reliable low-latency communications (URLLC). The described techniques may provide for handling collisions from one or more uplink transmissions from one or more user equipment (UEs) of a group of UEs. In one example, a base station may detect that a collision has occurred. As the base station is aware of the UEs that had been configured with transmission resources at the time of the collision, the base station may transmit a group feedback indication (e.g., a negative acknowledgement) to the group of UEs. UEs that had transmitted an uplink message could monitor for the group feedback indication and then retransmit the respective uplink message based on receipt of the group feedback indication. UEs that had not transmitted an uplink message could either not monitor for the group feedback indication, or at least ignore any received group feedback indications. Similar methods may be used to support retransmissions of multicast broadcasts from base stations.

A method of wireless communication at a UE is described. The method may include receiving a configuration for semi-persistent scheduling (SPS) of uplink transmissions by the UE, the configuration pertaining to a group of UEs that includes the UE, transmitting a message from the UE to a base station in accordance with the configuration, receiving a group feedback signal from the base station on feedback resources specified by the configuration, and re-transmitting the message to the base station based on receipt of the group feedback signal.

An apparatus for wireless communication at a UE is described. The apparatus may include a processor, memory in electronic communication with the processor, and instructions stored in the memory. The instructions may be executable by the processor to cause the apparatus to receive a configuration for SPS of uplink transmissions by the UE, the configuration pertaining to a group of UEs that includes the UE, transmit a message from the UE to a base station in accordance with the configuration, receive a group feedback signal from the base station on feedback resources specified by the configuration, and re-transmit the message to the base station based on receipt of the group feedback signal.

Another apparatus for wireless communication at a UE is described. The apparatus may include means for receiving a configuration for SPS of uplink transmissions by the UE, the configuration pertaining to a group of UEs that includes the UE, transmitting a message from the UE to a base station in accordance with the configuration, receiving a group feedback signal from the base station on feedback resources specified by the configuration, and re-transmitting the message to the base station based on receipt of the group feedback signal.

A non-transitory computer-readable medium storing code for wireless communication at a UE is described. The code may include instructions executable by a processor to receive a configuration for SPS of uplink transmissions by the UE, the configuration pertaining to a group of UEs that includes the UE, transmit a message from the UE to a base station in accordance with the configuration, receive a group feedback signal from the base station on feedback resources specified by the configuration, and re-transmit the message to the base station based on receipt of the group feedback signal.

Some examples of the method, apparatuses, and non-transitory computer-readable medium described herein may further include operations, features, means, or instructions for determining a monitoring occasion based on a time or frequency of transmission of the message and monitoring for the group feedback signal from the base station during the monitoring occasion.

In some examples of the method, apparatuses, and non-transitory computer-readable medium described herein, determining the monitoring occasion further may include operations, features, means, or instructions for receiving, in the configuration, an indication associated with a timing of the monitoring occasion.

In some examples of the method, apparatuses, and non-transitory computer-readable medium described herein, the group feedback signal pertains to UEs of the group of UEs that may be configured to transmit using a same resource of a specific TTI in accordance with the configuration.

In some examples of the method, apparatuses, and non-transitory computer-readable medium described herein, the group feedback signal pertains to UEs of the group of UEs that may be configured to transmit during a specific TTI in accordance with the configuration.

In some examples of the method, apparatuses, and non-transitory computer-readable medium described herein, the group feedback signal pertains to UEs of the group of UEs that may be configured to transmit during a specific TTI and to use a specific sub-band in accordance with the configuration.

In some examples of the method, apparatuses, and non-transitory computer-readable medium described herein, the group feedback signal pertains to UEs of the group of UEs that may be configured to transmit during a specific portion of a TTI and to use a specific sub-band in accordance with the configuration.

Some examples of the method, apparatuses, and non-transitory computer-readable medium described herein may further include operations, features, means, or instructions for transmitting the message as an initial transmission and using uplink repetition during a repetition window.

In some examples of the method, apparatuses, and non-transitory computer-readable medium described herein, receiving the group feedback signal may include operations, features, means, or instructions for receiving the group feedback signal over a resource associated with a last TTI or frequency resource in the repetition window such that the group feedback signal pertains to the entire repetition window.

In some examples of the method, apparatuses, and non-transitory computer-readable medium described herein, receiving the group feedback signal may include operations, features, means, or instructions for receiving the group feedback signal over a resource associated with each of the transmission time windows (TTIs) or frequency resources in the repetition window such that the group feedback signal includes individual group feedback indicators for each transmission in the repetition window.

In some examples of the method, apparatuses, and non-transitory computer-readable medium described herein, re-transmitting the message to the base station further may include operations, features, means, or instructions for re-transmitting a transport block (TB) of the message as part of an associated hybrid automatic repeat request acknowledgement (HARQ) process.

In some examples of the method, apparatuses, and non-transitory computer-readable medium described herein, re-transmitting the message to the base station further may include operations, features, means, or instructions for re-transmitting the message using next available SPS resources after a specified gap in time, in accordance with the configuration.

In some examples of the method, apparatuses, and non-transitory computer-readable medium described herein, the specified gap in time may be specified for the UE.

In some examples of the method, apparatuses, and non-transitory computer-readable medium described herein, the specified gap in time may be specified for the group of UEs.

In some examples of the method, apparatuses, and non-transitory computer-readable medium described herein, re-transmitting the message to the base station further may include operations, features, means, or instructions for re-transmitting the message using re-transmission resources specified by the configuration.

In some examples of the method, apparatuses, and non-transitory computer-readable medium described herein, the group feedback signal may be only received as a negative acknowledgement signal.

A method of wireless communication at a base station is described. The method may include transmitting, to a group of UEs, a configuration for SPS of uplink transmissions by the UEs, failing to decode a message that one of the UEs attempted to transmit to the base station in accordance with the configuration, transmitting a group feedback signal to the group of UEs on resources specified by the configuration, the group feedback signal being based on the failure to decode the message, and receiving a re-transmitted message from the one of the UEs, re-transmission of the message being based on the group feedback signal.

An apparatus for wireless communication at a base station is described. The apparatus may include a processor, memory in electronic communication with the processor, and instructions stored in the memory. The instructions may be executable by the processor to cause the apparatus to transmit, to a group of UEs, a configuration for SPS of uplink transmissions by the UEs, fail to decode a message that one of the UEs attempted to transmit to the base station in accordance with the configuration, transmit a group feedback signal to the group of UEs on resources specified by the configuration, the group feedback signal being based on the failure to decode the message, and receive a re-transmitted message from the one of the UEs, re-transmission of the message being based on the group feedback signal.

Another apparatus for wireless communication at a base station is described. The apparatus may include means for transmitting, to a group of UEs, a configuration for SPS of uplink transmissions by the UEs, failing to decode a message that one of the UEs attempted to transmit to the base station in accordance with the configuration, transmitting a group feedback signal to the group of UEs on resources specified by the configuration, the group feedback signal being based on the failure to decode the message, and receiving a re-transmitted message from the one of the UEs, re-transmission of the message being based on the group feedback signal.

A non-transitory computer-readable medium storing code for wireless communication at a base station is described. The code may include instructions executable by a processor to transmit, to a group of UEs, a configuration for SPS of uplink transmissions by the UEs, fail to decode a message that one of the UEs attempted to transmit to the base station in accordance with the configuration, transmit a group feedback signal to the group of UEs on resources specified by the configuration, the group feedback signal being based on the failure to decode the message, and receive a re-transmitted message from the one of the UEs, re-transmission of the message being based on the group feedback signal.

Some examples of the method, apparatuses, and non-transitory computer-readable medium described herein may further include operations, features, means, or instructions for indicating to the UEs, via the configuration, a timing indication associated with a monitoring occasion for the one of the UEs to monitor for the group feedback signal, where the monitoring occasion may be based on a time or frequency of transmission of the message by the one of the UEs.

In some examples of the method, apparatuses, and non-transitory computer-readable medium described herein, the group feedback signal pertains to UEs of the group of UEs that may be configured to transmit using a same resource of a specific TTI in accordance with the configuration.

In some examples of the method, apparatuses, and non-transitory computer-readable medium described herein, the group feedback signal pertains to UEs of the group of UEs that may be configured to transmit during a specific TTI in accordance with the configuration.

In some examples of the method, apparatuses, and non-transitory computer-readable medium described herein, the group feedback signal pertains to UEs of the group of UEs that may be configured to transmit during a specific TTI and to use a specific sub-band in accordance with the configuration.

In some examples of the method, apparatuses, and non-transitory computer-readable medium described herein, the group feedback signal pertains to UEs of the group of UEs that may be configured to transmit during a specific portion of a TTI and to use a specific sub-band in accordance with the configuration.

In some examples of the method, apparatuses, and non-transitory computer-readable medium described herein, transmitting the group feedback signal to the group of UEs on resources specified by the configuration may include operations, features, means, or instructions for identifying that uplink repetition may be enabled for the UEs and transmitting the group feedback signal over a resource associated with a last TTI or frequency resource in a repetition window associated with the uplink repetition such that the group feedback signal pertains to the entire repetition window.

In some examples of the method, apparatuses, and non-transitory computer-readable medium described herein, transmitting the group feedback signal to the group of UEs on resources specified by the configuration may include operations, features, means, or instructions for identifying that uplink repetition may be enabled for the UEs and transmitting the group feedback signal over a resource associated with each of the transmission time windows (TTIs) or frequency resources in a repetition window associated with the uplink repetition such that the group feedback signal includes individual group feedback indicators for each transmission in the repetition window.

In some examples of the method, apparatuses, and non-transitory computer-readable medium described herein, receiving the re-transmitted message from the one of the UEs further may include operations, features, means, or instructions for receiving the re-transmitted message via next available SPS resources after a specified gap in time, in accordance with the configuration.

Some examples of the method, apparatuses, and non-transitory computer-readable medium described herein may further include operations, features, means, or instructions for indicating the specified gap in time as a UE-specific gap in time.

Some examples of the method, apparatuses, and non-transitory computer-readable medium described herein may further include operations, features, means, or instructions for indicating the specified gap in time as a group-specific gap in time.

In some examples of the method, apparatuses, and non-transitory computer-readable medium described herein, receiving the re-transmitted message from the one of the UEs further may include operations, features, means, or instructions for receiving the re-transmitted message via re-transmission resources specified by the configuration.

In some examples of the method, apparatuses, and non-transitory computer-readable medium described herein, transmitting the group feedback signal to the group of UEs may include operations, features, means, or instructions for transmitting the group feedback signal to the group of UEs only if the group feedback signal may be a negative acknowledgement signal.

In some examples of the method, apparatuses, and non-transitory computer-readable medium described herein, transmitting the group feedback signal to the group of UEs may include operations, features, means, or instructions for transmitting the group feedback signal on resources that overlap with other transmissions to other UEs.

Some examples of the method, apparatuses, and non-transitory computer-readable medium described herein may further include operations, features, means, or instructions for rate-matching the transmissions to other UEs around resources used for transmission of the group feedback signal.

In some examples of the method, apparatuses, and non-transitory computer-readable medium described herein, the group feedback signal transmission resources may be covered by zero-power channel state information reference signal (ZP-CSI-RS) resources.

Some examples of the method, apparatuses, and non-transitory computer-readable medium described herein may further include operations, features, means, or instructions for configuring the other UEs with resources for the group feedback signal so that the other UEs may be enabled to rate-match around the resources for the group feedback signal.

A method of wireless communication at a base station is described. The method may include transmitting a multicast broadcast transmission to a group of UEs, receiving a feedback signal from at least one of the UEs, the feedback signal indicating that the UE did not decode the multicast broadcast transmission, and re-transmitting the multicast broadcast transmission to at least a subset of the group of UEs based on receipt of the feedback signal.

An apparatus for wireless communication at a base station is described. The apparatus may include a processor, memory in electronic communication with the processor, and instructions stored in the memory. The instructions may be executable by the processor to cause the apparatus to transmit a multicast broadcast transmission to a group of UEs, receive a feedback signal from at least one of the UEs, the feedback signal indicating that the UE did not decode the multicast broadcast transmission, and re-transmit the multicast broadcast transmission to at least a subset of the group of UEs based on receipt of the feedback signal.

Another apparatus for wireless communication at a base station is described. The apparatus may include means for transmitting a multicast broadcast transmission to a group of UEs, receiving a feedback signal from at least one of the UEs, the feedback signal indicating that the UE did not decode the multicast broadcast transmission, and re-transmitting the multicast broadcast transmission to at least a subset of the group of UEs based on receipt of the feedback signal.

A non-transitory computer-readable medium storing code for wireless communication at a base station is described. The code may include instructions executable by a processor to transmit a multicast broadcast transmission to a group of UEs, receive a feedback signal from at least one of the UEs, the feedback signal indicating that the UE did not decode the multicast broadcast transmission, and re-transmit the multicast broadcast transmission to at least a subset of the group of UEs based on receipt of the feedback signal.

In some examples of the method, apparatuses, and non-transitory computer-readable medium described herein, the base station re-transmits the multicast broadcast transmission to UEs of the group of UEs that may be configured to transmit the feedback signal using a same resource of a specific TTI.

In some examples of the method, apparatuses, and non-transitory computer-readable medium described herein, the base station re-transmits the multicast broadcast transmission to UEs of the group of UEs that may be configured to transmit the feedback signal during a specific TTI in accordance with the configuration.

In some examples of the method, apparatuses, and non-transitory computer-readable medium described herein, the base station re-transmits the multicast broadcast transmission to UEs of the group of UEs that may be configured to transmit the feedback signal during a specific TTI and to use a specific sub-band in accordance with the configuration.

In some examples of the method, apparatuses, and non-transitory computer-readable medium described herein, the base station re-transmits the multicast broadcast transmission to UEs of the group of UEs that may be configured to transmit the feedback signal during a specific portion of a TTI and to use a specific sub-band in accordance with the configuration.

In some examples of the method, apparatuses, and non-transitory computer-readable medium described herein, receiving the feedback signal may include operations, features, means, or instructions for receiving the feedback signal from more than one UE on a given physical uplink control channel or a group of physical uplink control channels.

In some examples of the method, apparatuses, and non-transitory computer-readable medium described herein, the feedback signal may be only received as a negative acknowledgement signal.

DETAILED DESCRIPTION

Figure 1:
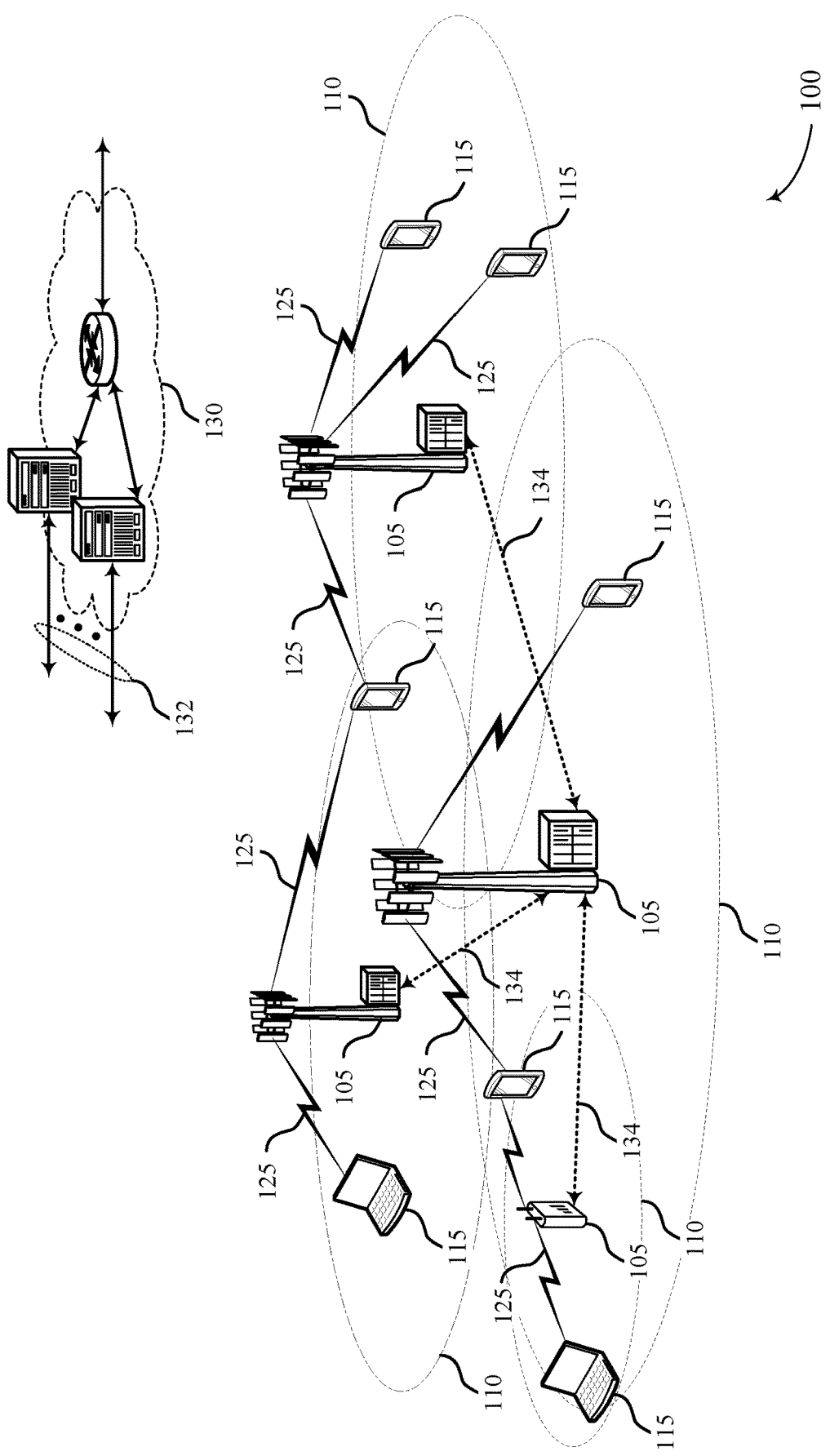
FIG. 1 an example of a system for wireless communications that supports group signaling for ultra-reliable low-latency communications (URLLC) in accordance with aspects of the present disclosure.

A wireless communications system may support a large number of user equipment (UEs). Industrial internet of things (IIoT) applications, for example, may involve very large numbers of UEs. In such applications, UEs may be grouped to transmit during certain shared resources. For example, a semi-persistent scheduling (SPS) configuration may be provided to the UEs such that each UE is aware of periodic resources that the UE may use for uplink (UL) transmissions. At any given UL transmission opportunity, a UE may share the UL transmission resources with other UEs. As such, collisions may occur. In this example, a base station may not receive a UL transmission from a UE of a UE group. In some cases, the base station may identify the UEs that attempted to send transmissions to the base station. In those cases, the base station would traditionally provide separate retransmission grants to the affected UEs. However, a base station may also avoid the need to send so many individual grants by instead sending a group feedback indication to the group of UEs.

In an SPS-configured system, the base station may be aware of which UEs are scheduled for UL transmissions at a same time and on the same resources. Thus, if the base station detects that one or more transmissions were attempted at a given time, the base station can determine that one or more UEs of a group of UEs (scheduled for that time) made the attempt. The base station need not be aware of the specific UEs that attempted transmission. As such, upon detection of a failed uplink attempt, the base station may transmit a group feedback indication. The group feedback indication could be either an acknowledgement (ACK) or a negative acknowledgement (NAK). However, as a block error rate (BLER) target of initial SPS transmissions is generally low, the likelihood of sending a NAK is low. As such, in most cases, only an ACK would be sent. In this example, sending a group-feedback indication for every transmission opportunity (either an ACK or a NAK), may not be necessary. Instead, a simpler option may involve only sending a NAK in the group feedback indications.

Thus, when a base station detects a collision, the base station may transmit a group feedback indication (e.g., a NAK) to all of the UEs in the group of UEs scheduled for transmissions at that time. UEs that sent a transmission may monitor for and receive the group feedback indication, and then retransmit based on receipt of a NAK (regardless of whether the NAK pertained to their previous transmission). UEs that did not send a transmission may elect to not monitor for the group feedback indications, or if a NAK is detected, these UEs may choose to ignore the group feedback indication. In some examples, the ACK or NAK could be sent separately for each UE. For example, the ACK or NAK could be sent separately using different sequences (e.g., a Physical Channel Hybrid ARQ Indicator Channel (PHICH) or similar) or using a group-common Physical Downlink Control Channel (PDCCH). In some examples, the content may include a sequence, where each UE has an index configured by a Radio Resource Control (RRC) and can find the relevant ACK/NAK bits within the larger sequence.

Similar principles may be extended to transmission and retransmission of multicast broadcasts.

Aspects of the disclosure are initially described in the context of a wireless communications system. Aspects of the disclosure are further illustrated by examples of systems that include a base station and multiple UEs. Aspects of the disclosure are further illustrated by examples of systems that depict the uplink and downlink transmissions between a base station and a UE of a group of UEs. Aspects of the disclosure are further illustrated by and described with reference to apparatus diagrams, system diagrams, and flowcharts that relate to group signaling for URLLC.

FIG. 1 illustrates an example of a wireless communications system 100 that supports group signaling for URLLC in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In one example, a UE may receive a configuration for SPS of UL transmissions by the UE. The received configuration may pertain to the UE and a corresponding UE group. The UE may transmit a message to a base station in compliance with the configuration. The base station may receive this message, but may not be able to decode the UE message, due to, for example, the message colliding with other UL messages sent on the same resources by UEs in the group. In this case, the base station may transmit a group feedback signal to the entire UE group. The UE that transmitted the message may then receive the group feedback signal from the base station on resources that were specified by the SPS configuration. In one example, the group feedback signal transmitted by the base station may be a NAK signal that is transmitted to the UE as well as to the UE group. After the UE receives the group feedback signal, the UE may re-transmit the original message to the base station using the resources specified by the SPS configuration—either the next available SPS resources or some dedicated retransmission resources.

Figure 2:
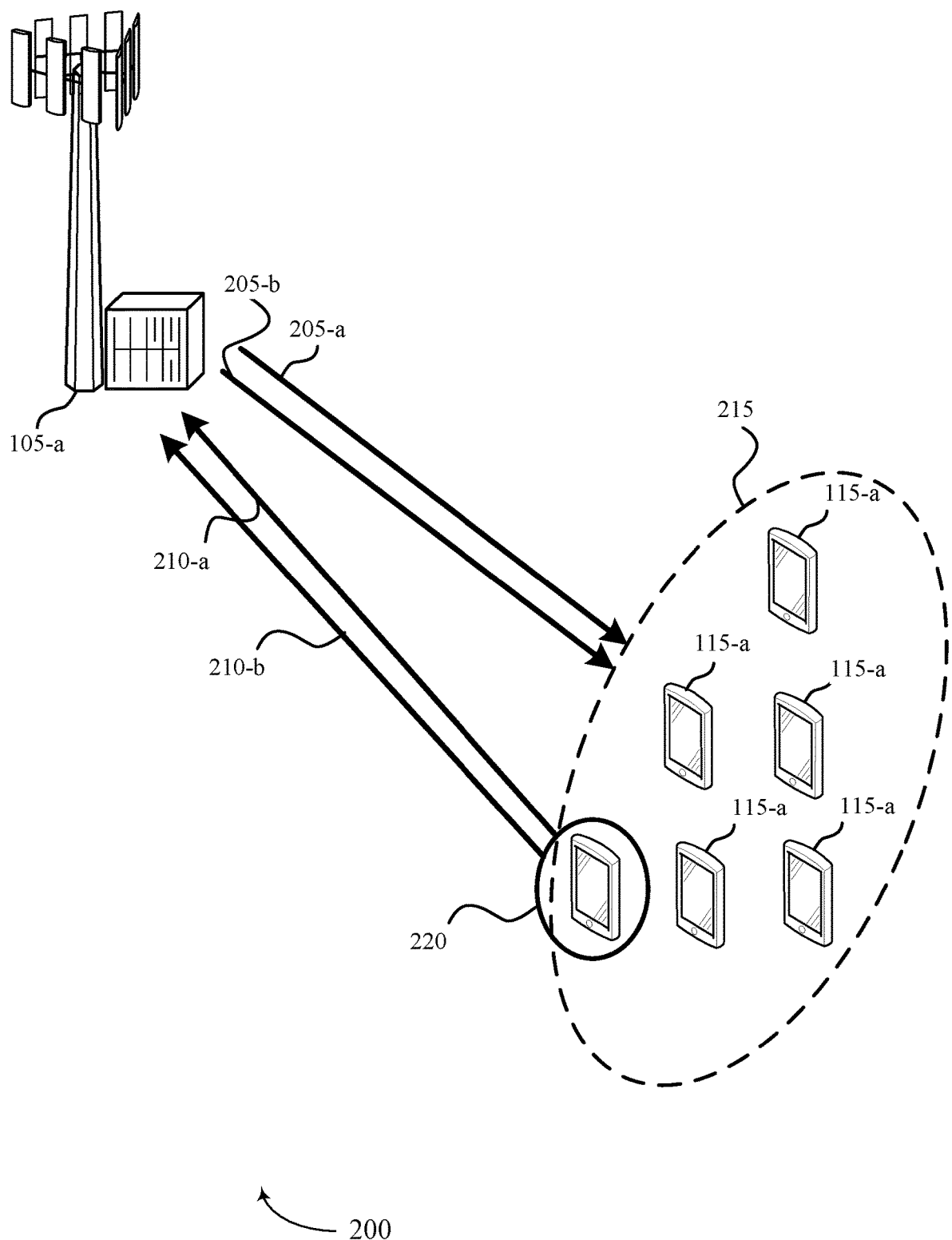
FIG. 2 illustrates an example of a system for wireless communications that supports group signaling for URLLC in accordance with aspects of the present disclosure.

FIG. 2 illustrates an example of a system for wireless communications 200 that supports group signaling for URLLC in accordance with aspects of the present disclosure. In some examples, the wireless communications system 200 may implement aspects of wireless communications system 100. The system 200 may depict a base station 105-a and a UE group 215. The UE group 215 may include multiple UEs 115-a and a UE 220. Base station 105-a and UEs 115-a and 220 may be examples of the base stations and UEs discussed with reference to FIG. 1.

In FIG. 2, the base station 105-a may transmit configuration information as illustrated by the transmission 205-a. The configuration information may include an SPS configuration of UL transmissions from the UEs 115-a and 220 and may be configured specifically for the UE group 215 and may additionally allow the base station 105-a to identify the UE group 215 by any transmission of any UE 115-a and 220 of the UE 215 group that transmits in compliance with the configuration received by the base station 105-a in transmission 205-a.

Next, the UE 220 may transmit UL data in transmission 210-a, in compliance with the configuration sent by the base station 105-a. After the UE group 215 receives the transmission 205-a from the base station 105-a and the UE 220 transmits the UL data in transmission 210-a, the UE 220 may determine a monitoring occasion for monitoring for a group feedback signal from the base station 105-a. The base station 105-a may receive the UE 220 transmission, but in some cases may not be able to decode the transmission and may also not know which UE 115-a or 220 sent the transmission. The base station 105-a may recognize the transmission and identify that it was received from the UE group 215 since the UE 220 transmitted the data in compliance with the configuration. The base station 105-a may then transmit a group feedback signal in transmission 205-b to the UE group 215, which includes the UE 220. The UE group 215 may receive the transmission 205-b, but only the UEs that previously transmitted (e.g., UE 220) may actually take action in response to receiving the group feedback signal by re-transmitting the data in transmission 210-b. The other UEs 115-a of the UE group 215 may not take any action upon receiving the transmission 205-b from the base station 105-a as the other UEs 115-a did not transmit any data to the base station 105-a before receiving the group feedback signal.

Wireless communications system 200 may support at least two different grant free transmission modes. Grant free transmission modes may otherwise be known as grant free modes or configured-grant modes. The first grant free mode may include an UL data transmission without grant and which may be based solely on RRC configuration or reconfiguration without any L1 signaling. The second grant free mode may include an UL data transmission without grant and which may be based on both RRC configuration and L1 signaling for activation or de-activation.

For these grant free modes, UL repetition may be allowed. A number of techniques may be employed to increase the reliability of a wireless packet transmission, including increasing transmission power, changing a modulation coding scheme (MCS), and the like. One technique for increasing reliability (which may be referred to as repetition), may be to transmit multiple copies of a wireless packet. The copies of the wireless packet may each be received and decoded by an intended device such as a base station 105-*a* or a UE 115-*a* and 220. In such cases, the device may successfully decode the wireless packet if it successfully decodes just one of the copies. In some cases, the device may successfully decode the wireless packet even if it fails to decode any of the copies—e.g., by combining the copies and decoding the combined version in a process that may be referred to as soft combining. In using wireless repetition, a repetition window with a given periodicity and offset may be configured and a redundancy version (RV) sequence may be further configured to increase reliability. In one example, the repetition factor or overlap factor may be K, a number of times that the transmission of a transmission block is repeated. Additionally, the initial transmission can start anywhere within the repetition window if the RV is set to zero.

In some examples of grant free modes, the same set of resources may be configured for a group of UEs 215 on a per TTI basis. The configured resources may hop across time and in this case, the UE grouping may change from one TTI to the next TTI. In one example, UL transmissions from different UEs 115-*a* and 220 of the UE group 215 may collide when multiple UEs 115-*a* and 220 have data to transmit on the same resources. Thus, in these instances, the base station 105-*a* may transmit a group feedback signal.

In some examples, the group feedback signal may be either one of an ACK or NAK signal. As explained above, however, transmitting the group feedback signal as only a NAK signal may simplify the group feedback process. The group feedback signal may be transmitted to different categories of UE groups 215. In one example, the group feedback signal may be transmitted to all the UEs 115-*a* and 220 of a UE group 215 that may share a configured resource in a given TTI. In another example, the group feedback signal may be transmitted to all the UEs 115-*a* and 220 of a UE group 215 having a configured resource in a same or common TTI. In another example, the group feedback signal may be transmitted to all UEs 115-*a* and 220 of a UE group 215 with a configured resource in a TTI and with a specific sub-band of bandwidth frequencies. In yet another example, the group feedback signal may be transmitted to all UEs 115-*a* and 220 of a UE group 215 with a configured resource covering a specific sub-band of bandwidth frequencies and/or a sub-TTI. Continuing this example, in a TTI with two symbols and four sub-bands, an eight group—group ACK/NAK resource may be defined and may correspond to 2×4 TTI sub-band combinations.

In each of these examples, the ACK/NAK monitoring occasion may be determined as a function of the time and/or frequency of the UL transmission. In the example in which the UE group 215 shares a configured resource in a given TTI, the ACK/NAK, assuming that it is transmitted, for UL transmission in slot/mini-slot n may be transmitted in slot/mini-slot n+m, where m may be indicated to the UEs. In another example in which the group feedback signal may be transmitted to all UEs of a UE group 215 with a configured resource in a TTI and a specific sub-band of bandwidth frequencies, the ACK/NAK, assuming that it is transmitted, for UL transmission in slot/mini-slot n and sub-band j may be sent in slot/mini-slot n+m and over a configured set of frequency resources.

In another example, UL repetition may be adopted for the wireless communications system. Employing UL repetition may entail transmitting multiple copies of a wireless packet. In this example, a given UE may expect a group feedback signal, such as an ACK/NAK signal, over a resource associated with the last TTI or frequency resource in the repetition window, or one possible ACK/NAK for the entire window. Additionally, a given UE may expect a group feedback signal, such as an ACK/NAK signal, over a resource associated with each of the TTI or frequency resource in the repetition window or an individual ACK/NAK signal for each transmission in the window.

Additionally, a UE 115-*a* or 220 and its UE group 215 may detect or receive the group feedback signal transmitted by the base station 105-*a*. The UE 115-*a* or 220 of the UE group 215 may be the UE that performed the UL transmission over a resource in accordance with the configuration and associated with the detected NAK signal, and the UE may re-transmit the transport block (TB) of the HARQ process. If the UE of the UE group 215 did not transmit any data over the resource in accordance with the configuration and associated with the detected NAK signal, the UE may not do anything.

Although in FIG. 2, the UE may determine a monitoring occasion for monitoring for a group feedback signal from the base station 105-*a*, alternatively, the UE may transmit an ACK. If the UE transmits an ACK, the UE may not monitor the PDCCH associated with a TB re-transmission. In the case the UE monitors the re-transmission PDCCH, if the signal is detected, the UE may ignore it, or the UE may not need to decode the TB again.

In the case the UE re-transmits the original data to the base station 105-*a*, the UE may employ one of many options. The UE may re-transmit and employ the configured resources for its UL grant free transmission starting from the NAK reception plus an additional gap. The gap may be configured for each UE of the group of UEs. Alternatively, the UE may re-transmit using some resource that may be taken aside for re-transmission of each UE, which may be different than the regular configured resources.

As previously discussed, in each of the examples and cases, the group feedback signal or ACK/NAK may be transmitted by a UE over time or frequency resources that could potentially overlap with other UE signals or transmissions. Additionally, or alternatively, the group feedback signal may puncture the resources that might be allocated to other UEs. In one example, some resources that might allocated for ACK/NAK transmission may be configured for users and may puncture the resources that might be allocated to other UEs. Additionally or alternatively, other signals or transmissions may be rate-matched around the resources allocated for ACK/NAK transmission. Further, there may be different ways to indicate to other UEs to rate-match around the group feedback signal resources or ACK/NAK resources. In one example, to accommodate rate-matching, the ACK/NAK resources may be covered by zero-power channel state information reference signal resources (ZP-CSI-RS resources). In another example, some resources that might be allocated for ACK/NAK transmission may be configured for all other users for the purpose of rate-matching and to avoid accidental puncturing. The group of users to which the ACK/NAK bits is intended may, by default, rate-match around the resource used for the ACK/

NAK transmission when their downlink data resources overlap with the ACK/NAK resources.

In another example, aspects of the group signaling principles described above may also be utilized for downlink data transmissions as well to enhance the reliability of multicast traffic. In an example, a base station 105-a may transmit a multicast broadcast transmission to a group of UEs 215. While many of the UEs 115-a and 220 may successfully receive the multicast broadcast, a particular UE 115-a or 220 may not receive or properly decode the multicast broadcast. In that instance, the particular UE 115-a or 220 may transmit a NAK to the base station 105-a. Instead of determining which UE 115-a and 220 of the group of UEs 215 transmitted the NAK, the base station 105-a may simply re-transmit its multicast broadcast to all UEs 115-a and 220 in the group of UEs 215. The re-transmission may be transmitted to different categories of UE groups 215. In one example, the re-transmitted signal may be transmitted to all the UEs 115-a and 220 of a UE group 215 that may share a configured resource in a given TTI. In another example, the re-transmitted signal may be transmitted to all the UEs 115-a and 220 of a UE group 215 with a configured resource in a TTI. In another example, the re-transmitted signal may be transmitted to all UEs 115-a and 220 of a UE group 215 with a configured resource in a TTI and a specific sub-band of bandwidth frequencies. In another example, the re-transmitted signal may be transmitted to those UEs 115-a and 220 of the UE group 215 that transmitted a NAK to the base station 105-a. That is, the re-transmitted signal may not be transmitted to those UEs 115-a and 220 that did not transmit a NAK to the base station. In yet another example, the re-transmitted signal may be transmitted to all UEs 115-a and 220 of a UE group 215 with a configured resource covering a specific sub-band of bandwidth frequencies and/or a sub-TTI. Continuing this example, in a TTI with two symbols and four sub-bands, an eight group—group ACK/NAK resource may be defined and may correspond to 2×4 TTI sub-band combinations.

In each of these DL data transmission categories, the resources may be mapped to a given PUCCH resource or a group of PUCCH resources, as one resource per UE 115-a and 220. Additionally, for the case of a single PUCCH for each instance, UEs 115-a and 220 may send only a NAK and not an ACK, or both an ACK and a NAK. Should the base station 105-a detect a NAK, regardless of which UE 115-a or 220 of the UE group 215 transmits the NAK, the TB may be transmitted to all of the UES 115-a and 220 of the UE group 215 again.

Figure 3:
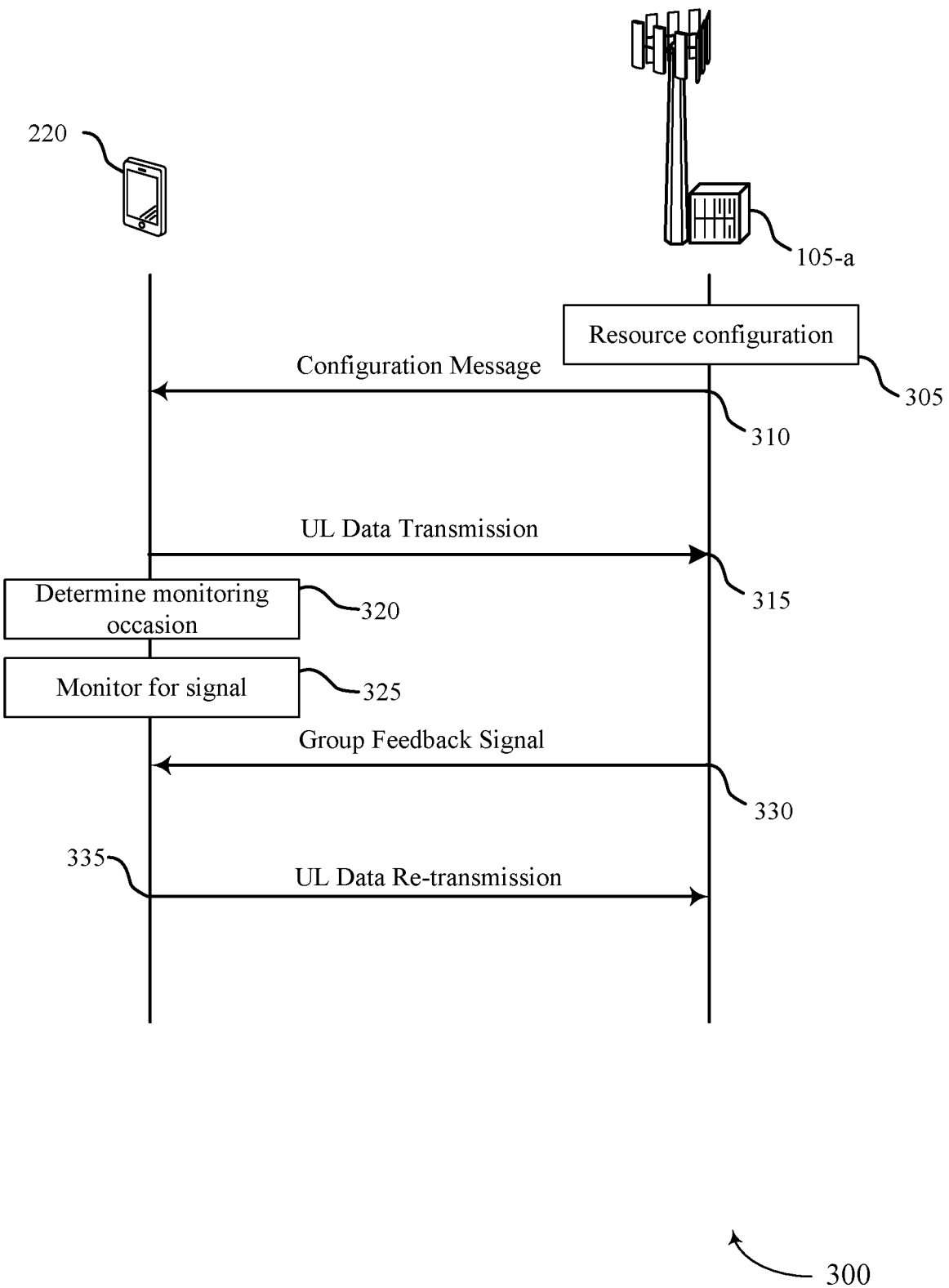
FIG. 3 illustrates an example of a process flow that supports group signaling for URLLC in accordance with aspects of the present disclosure.

FIG. 3 illustrates an example of a of a process flow 300 that supports group signaling for URLLC in accordance with aspects of the present disclosure. In some examples, the process flow 300 may implement aspects of wireless communications system 100. The process flow 300 may depict the series of transmissions passing between the base station 105-a and the UE 220 as discussed with reference to FIGS. 1 and 2.

In FIG. 3, the base station 105-a may create a resource configuration 305 to be sent to the UE 220 which belongs to the UE group 215 as shown in FIG. 2. At 310, base station 105-a may transmit a configuration message to UE 220, which UE 220 may receive, and the configuration message may configure the resources of UE 220 (UE 220 may be one of the UEs 115-a which are all a part of UE group 215 illustrated in FIG. 2). The UE 220, along with all of the UEs 115-a of FIG. 2, may be configured to transmit messages in accordance with the configuration sent by the base station 105-a. The configuration message sent by the base station 105-a may include configuration information as well as information that identifies the UE group 215.

At 315, UE 220 (or any of the UEs 115-a of the UE group 215) may transmit an UL data transmission, based on the configuration message and may utilize the associated configuration. The UEs 115-a and 220 of the UE group 215 may determine a monitoring occasion at 320 as a result of receiving the configuration message at 310. The UEs 115-a and 220 of the UE group 215 that transmitted an UL data transmission (for example, UE 220) may then monitor for a signal such as a group feedback signal at 325, from the base station 105-a, as a result of previously receiving the configuration message from the base station 105-a. Alternatively, all of the UEs 115-a may monitor for the group feedback signal even though some of the UEs 115-a did not transmit at all—the UE 220 may be the only UE that transmitted a message.

At 330, UEs 115-a including the transmitting UE 220 may receive a group feedback signal from the base station 105-a in accordance with the configuration. The group feedback signal may be an ACK/NAK signal or may be a NAK signal. Even though the UE 220 may be the only UE 115-a and 220 of the UE group 215 that transmitted a message, all of the UEs 115-a of the UE group 215 may receive the group feedback signal. UEs that did not previously transmit a message will not do anything upon receipt of the group feedback signal from the base station 105-a. At 335, UE 220 (and any UEs that had transmitted an UL signal) may re-transmit respective UL data messages in accordance with the configuration.

Figure 4:
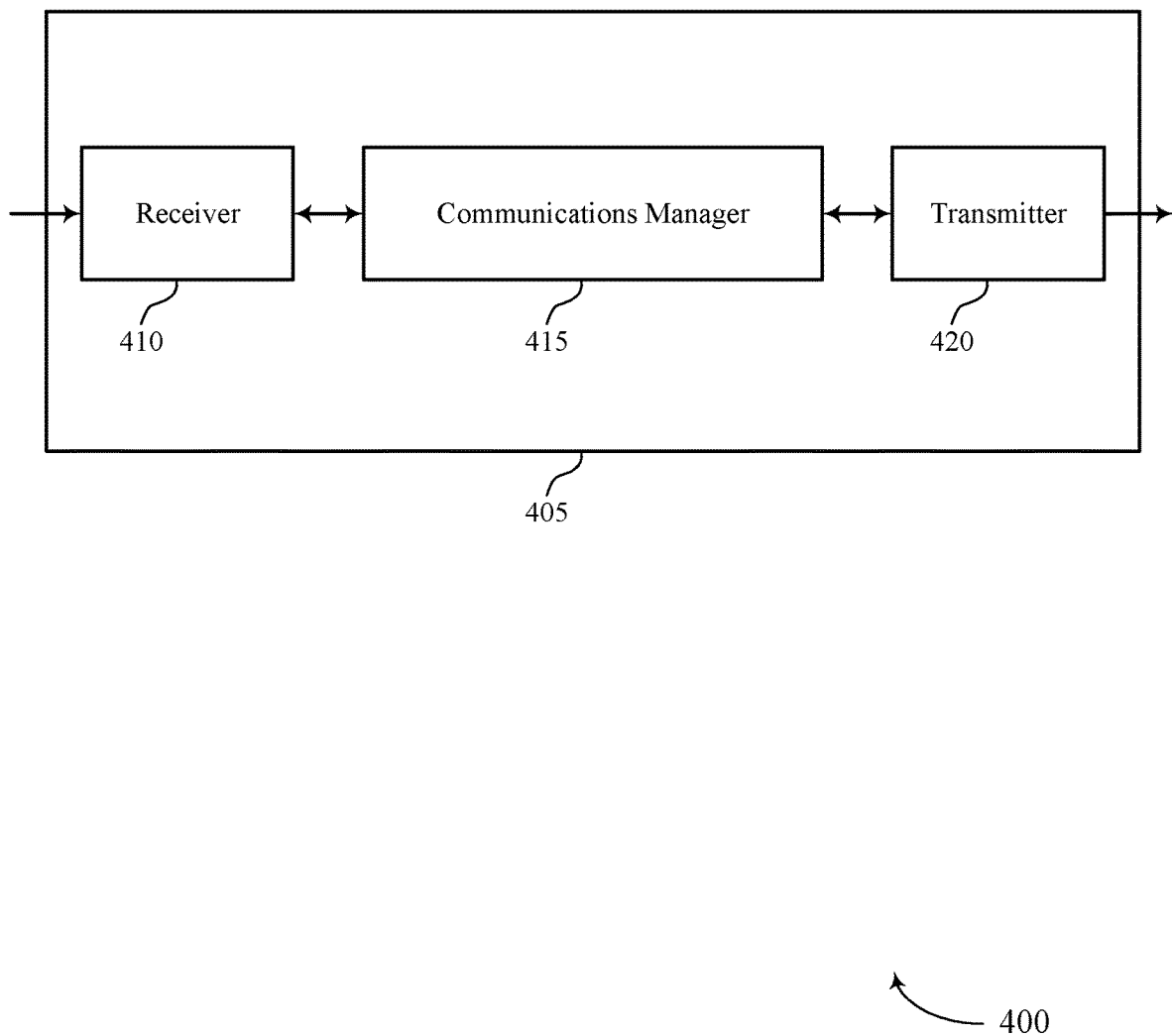
FIGS. 4 and 5 show block diagrams of devices that support group signaling for URLLC in accordance with aspects of the present disclosure.

FIG. 4 shows a block diagram 400 of a device 405 that supports group signaling for URLLC in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to group signaling for URLLC, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may receive a configuration for SPS of uplink transmissions by the UE, the configuration pertaining to a group of UEs that includes the UE, receive a group feedback signal from the base station on feedback resources specified by the configuration, transmit a message from the UE to a base station in accordance with the configuration, and re-transmit the message to the base station based on receipt of the group feedback signal. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

Figure 5:
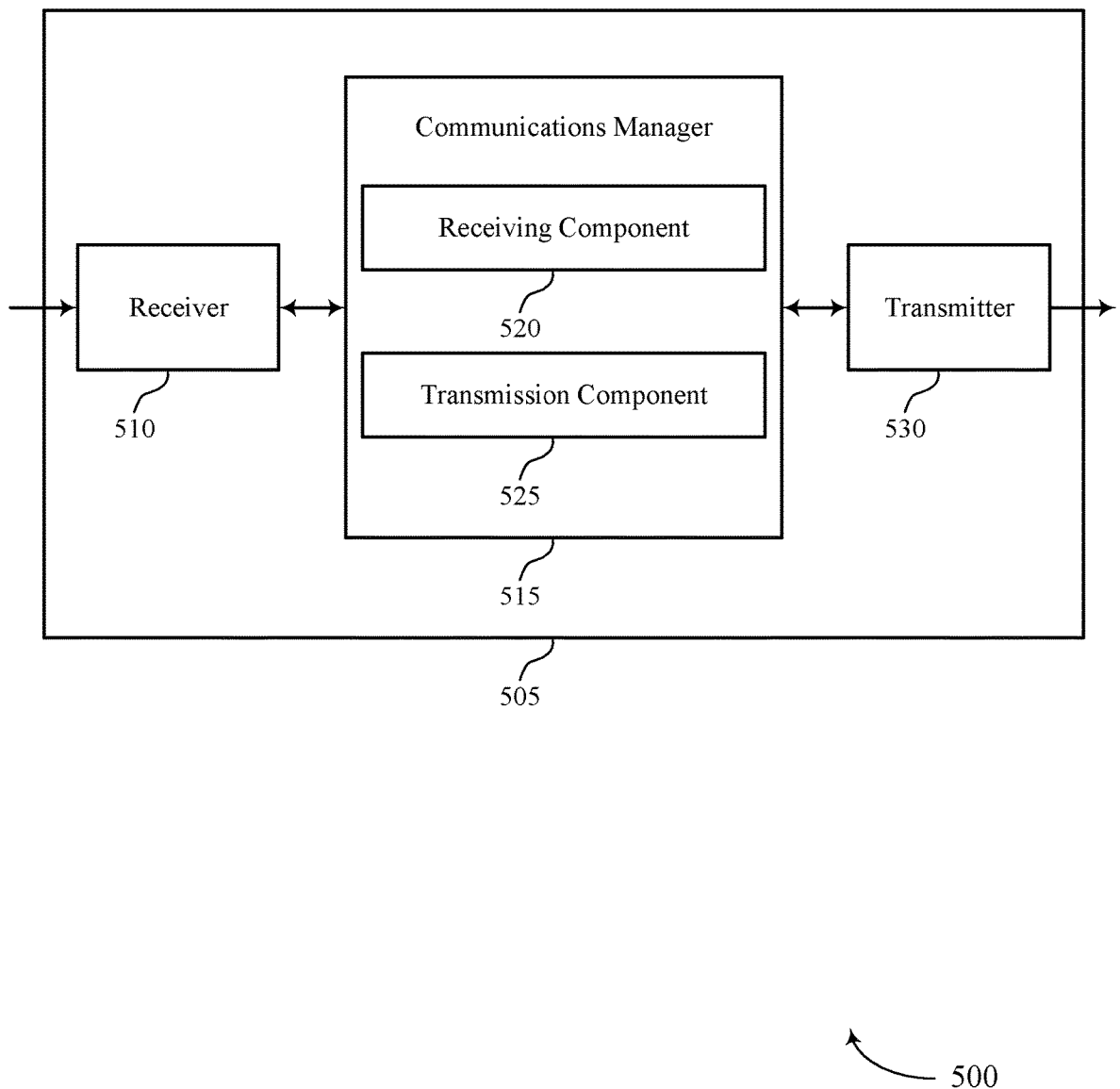

FIG. 5 shows a block diagram 500 of a device 505 that supports group signaling for URLLC in accordance with aspects of the present disclosure. The device 505 may be an example of aspects of a device 405 or a UE 115 as described herein. The device 505 may include a receiver 510, a communications manager 515, and a transmitter 530. The device 505 may also include a processor. Each of these components may be in communication with one another (e.g., via one or more buses).

The receiver 510 may receive information such as packets, user data, or control information associated with various information channels (e.g., control channels, data channels, and information related to group signaling for URLLC, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a receiving component 520 and a transmission component 525. The communications manager 515 may be an example of aspects of the communications manager 710 described herein.

The receiving component 520 may receive a configuration for SPS of uplink transmissions by the UE, the configuration pertaining to a group of UEs that includes the UE and receive a group feedback signal from the base station on feedback resources specified by the configuration.

The transmission component 525 may transmit a message from the UE to a base station in accordance with the configuration and re-transmit the message to the base station based on receipt of the group feedback signal.

The transmitter 530 may transmit signals generated by other components of the device 505. In some examples, the transmitter 530 may be collocated with a receiver 510 in a transceiver module. For example, the transmitter 530 may be an example of aspects of the transceiver 720 described with reference to FIG. 7. The transmitter 530 may utilize a single antenna or a set of antennas.

Figure 6:
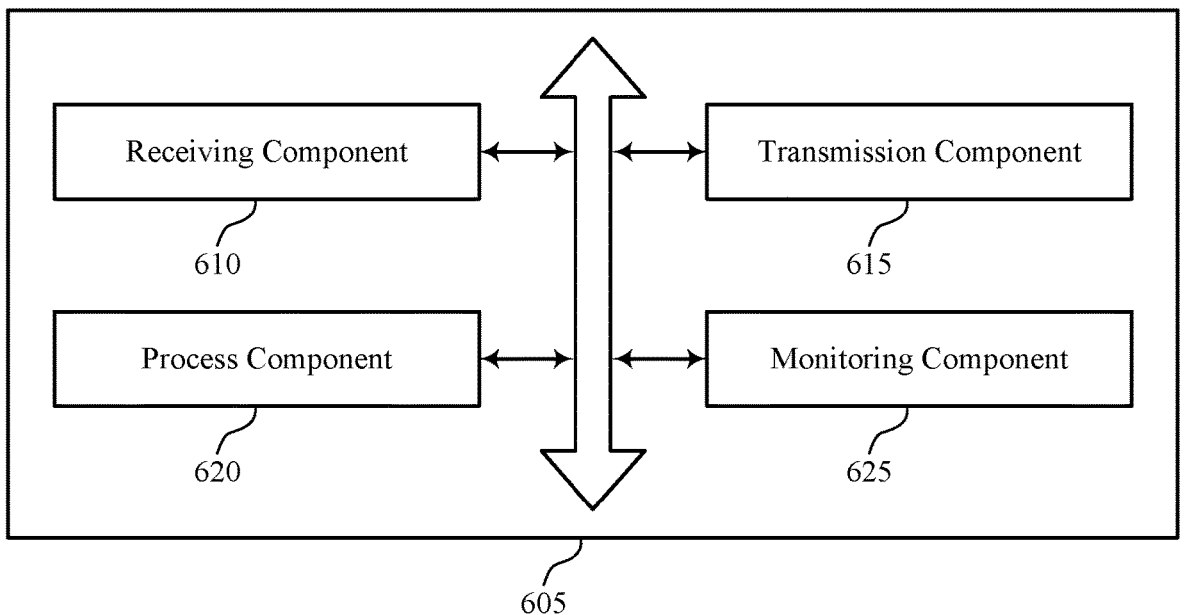
FIG. 6 shows a block diagram of a communications manager that supports group signaling for URLLC in accordance with aspects of the present disclosure.

FIG. 6 shows a block diagram 600 of a communications manager 605 that supports group signaling for URLLC in accordance with aspects of the present disclosure. The communications manager 605 may be an example of aspects of a communications manager 415, a communications manager 515, or a communications manager 710 described herein. The communications manager 605 may include a receiving component 610, a transmission component 615, a process component 620, and a monitoring component 625. Each of these modules may communicate, directly or indirectly, with one another (e.g., via one or more buses).

The receiving component 610 may receive a configuration for SPS of uplink transmissions by the UE, the configuration pertaining to a group of UEs that includes the UE. In some examples, the receiving component 610 may receive a group feedback signal from the base station on feedback resources specified by the configuration.

The transmission component 615 may transmit a message from the UE to a base station in accordance with the configuration. In some examples, the transmission component 615 may re-transmit the message to the base station based on receipt of the group feedback signal. In some examples, the transmission component 615 may re-transmit the message to the base station only when the UE has received a NAK from the base station.

The process component 620 may determine a monitoring occasion based on a time or frequency of transmission of the message.

The monitoring component 625 may monitor for the group feedback signal from the base station during the monitoring occasion.

Figure 7:
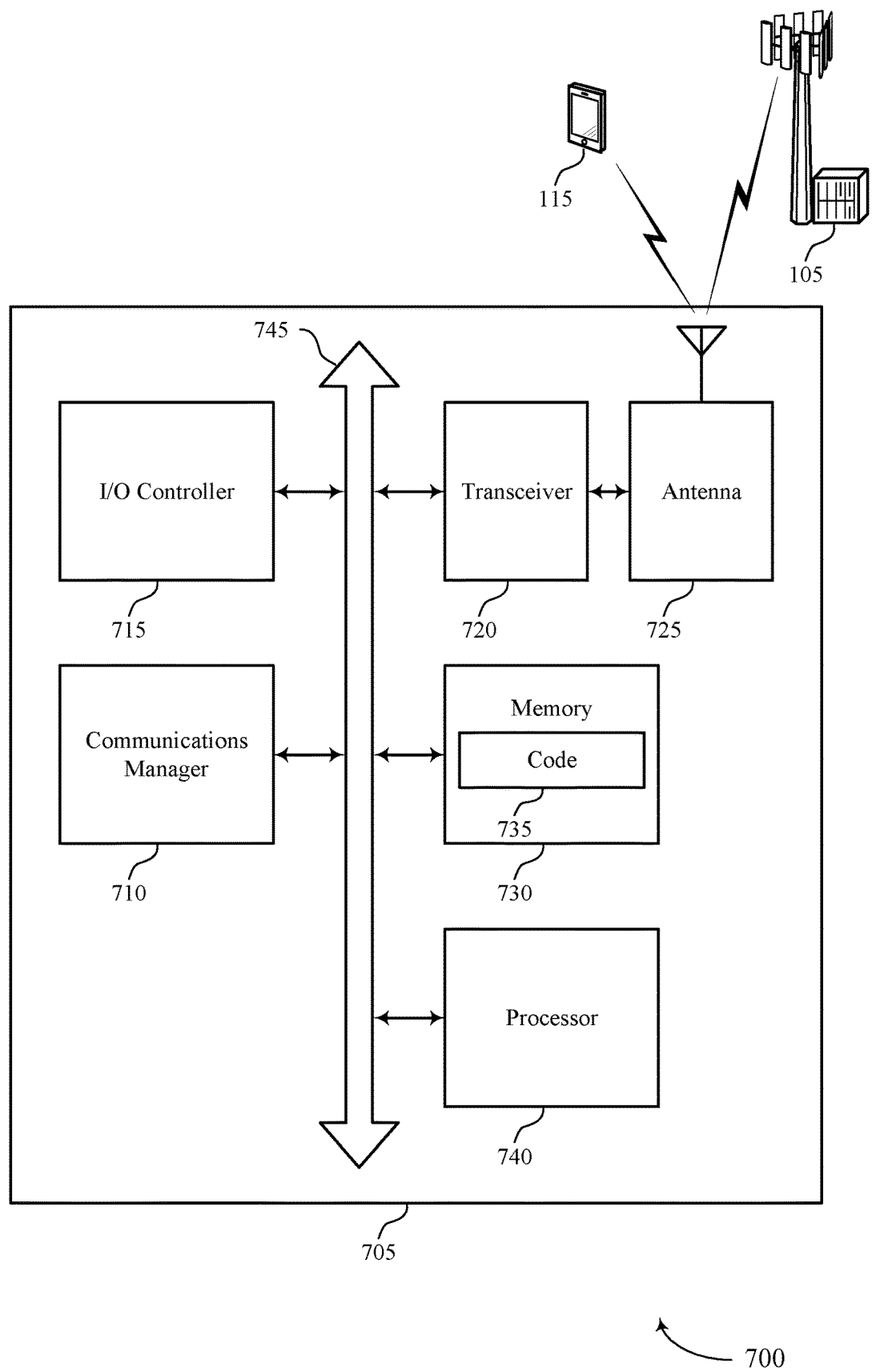
FIG. 7 shows a diagram of a system including a device that supports group signaling for URLLC in accordance with aspects of the present disclosure.

FIG. 7 shows a diagram of a system 700 including a device 705 that supports group signaling for URLLC in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may receive a configuration for SPS of uplink transmissions by the UE, the configuration pertaining to a group of UEs that includes the UE, receive a group feedback signal from the base station on feedback resources specified by the configuration, transmit a message from the UE to a base station in accordance with the configuration, and re-transmit the message to the base station based on receipt of the group feedback signal.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the device 705 may include a single antenna 725. However, in some cases the device 705 may have more than one antenna 725, which may be capable of concurrently transmitting or receiving multiple wireless transmissions.

The memory 730 may include random-access memory (RAM) and read-only memory (ROM). The memory 730 may store computer-readable, computer-executable code 735 including instructions that, when executed, cause the processor 740 to perform various functions described herein. In some cases, the memory 730 may contain, among other things, a BIOS which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting group signaling for URLLC).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
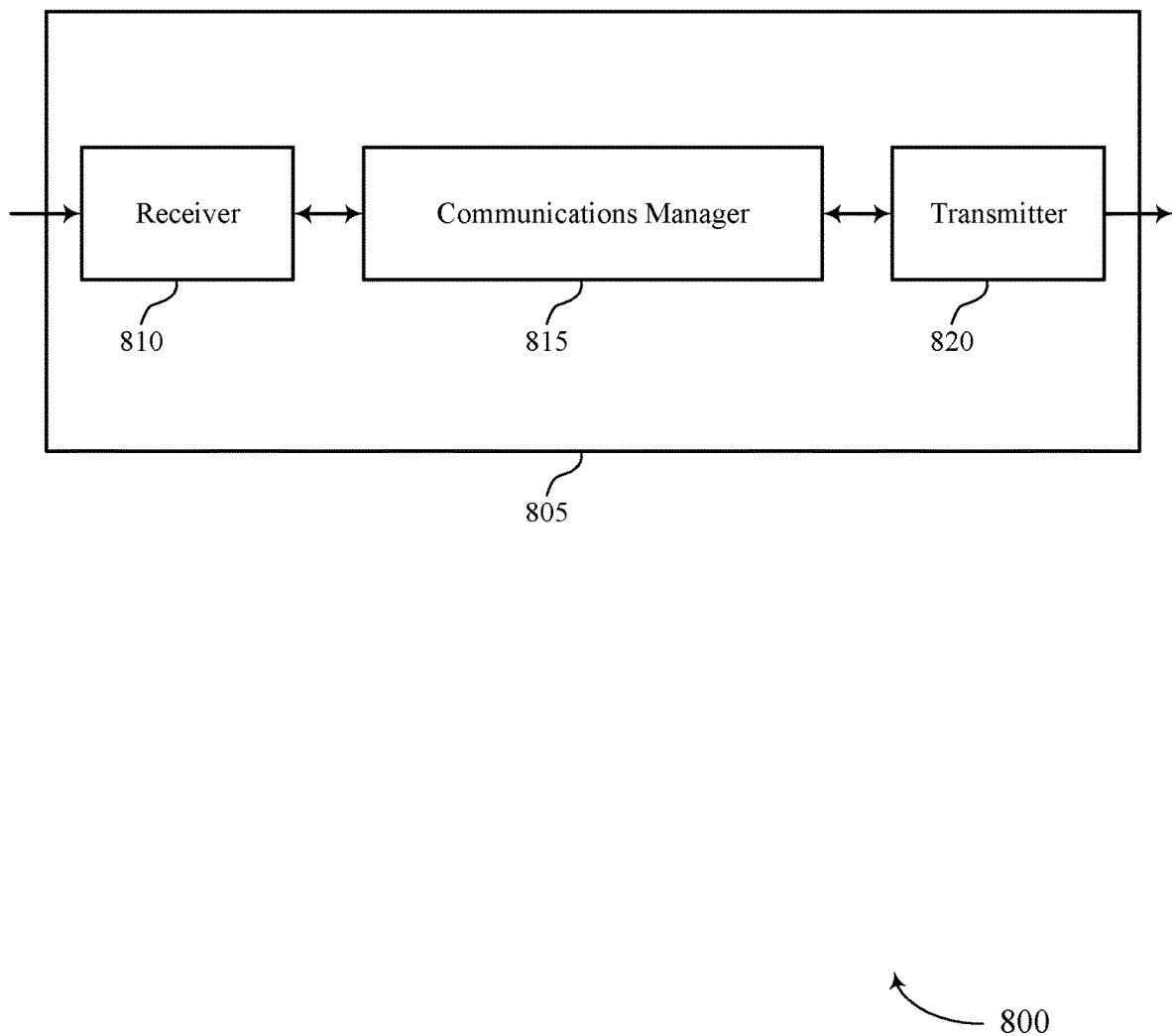
FIGS. 8 and 9 show block diagrams of devices that support group signaling for URLLC in accordance with aspects of the present disclosure.

FIG. 8 shows a block diagram 800 of a device 805 that supports group signaling for URLLC in accordance with aspects of the present disclosure. The device 805 may be an example of aspects of a base station 105 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to group signaling for URLLC, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may transmit, to a group of UEs, a configuration for SPS of uplink transmissions by the UEs. The communications manager 815 may fail to decode a message that one of the UEs attempted to transmit to the base station in accordance with the configuration. The communications manager 815 may transmit a group feedback signal to the group of UEs on resources specified by the configuration, the group feedback signal being based on the failure to decode the message. The communications manager 815 may also receive a re-transmitted message from the one of the UEs, the re-transmission of the message being based on the group feedback signal.

In another instance, the communications manager 815 may transmit a multicast broadcast transmission to a group of UEs, re-transmit the multicast broadcast transmission to at least a subset of the group of UEs based on receipt of the feedback signal, and receive a feedback signal from at least one of the UEs, the feedback signal indicating that the UE did not decode the multicast broadcast transmission. The subset of the group of UEs may include some or all the UEs of the group of UEs which the device 805 received a feedback signal from. In some examples, the feedback signal is a NAK. That is, in some examples, the device 805 only re-transmits the multicast broadcast transmission to those UEs from which it received a NAK regarding the original transmission. In some examples, the subset of the group of UEs may include all of the UEs in the group, regardless of whether each UE sent a feedback signal. In some examples, the original transmission is re-transmitted as a broadcast message or as a unicast message, which may be a in unicast physical downlink shared channel (PDSCH). The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
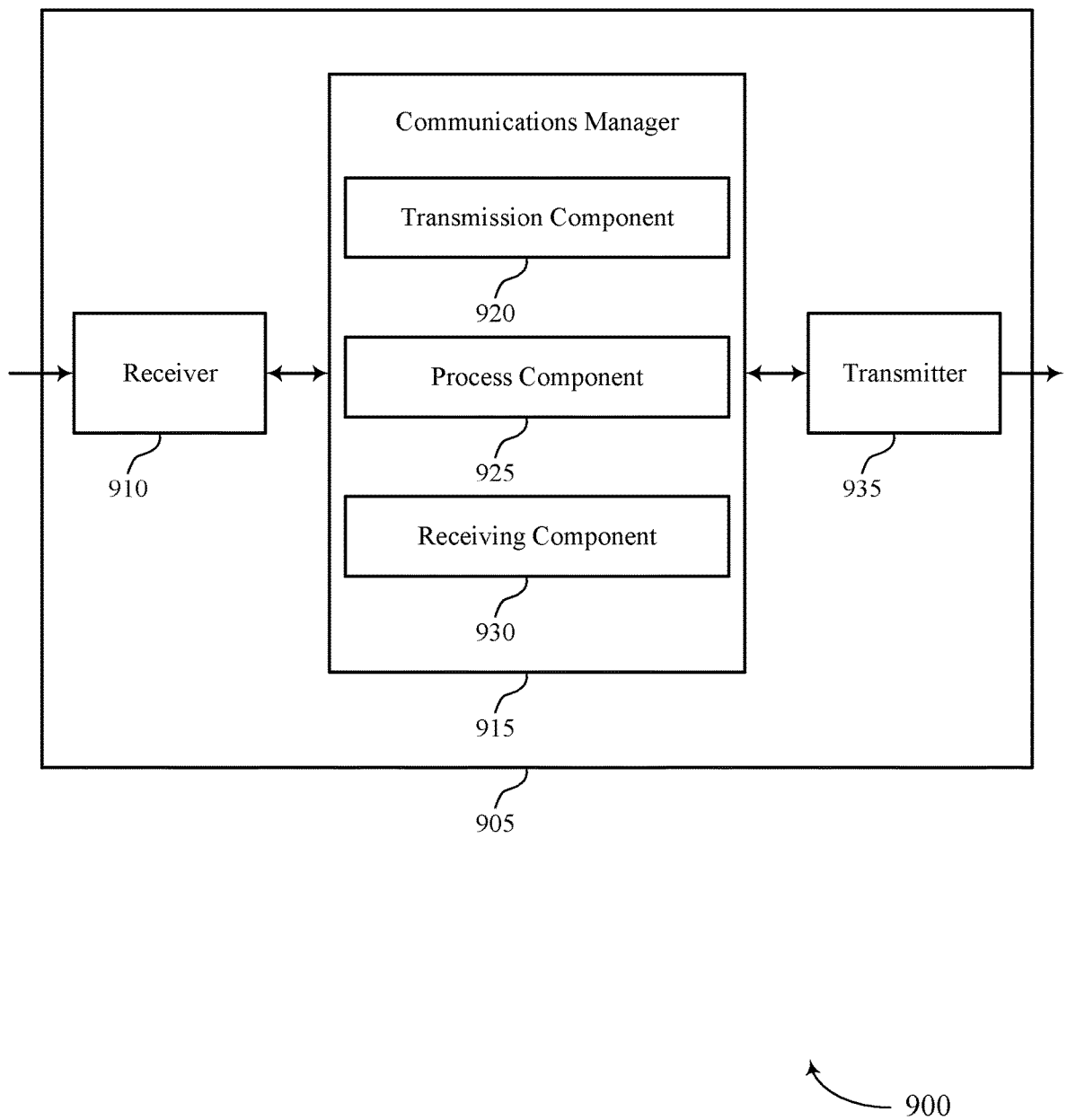

FIG. 9 shows a block diagram 900 of a device 905 that supports group signaling for URLLC in accordance with aspects of the present disclosure. The device 905 may be an example of aspects of a device 805 or a base station 115 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to group signaling for URLLC, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a transmission component 920, a process component 925, and a receiving component 930. The communications manager 915 may be an example of aspects of the communications manager 1110 described herein.

The transmission component 920 may transmit, to a group of UEs, a configuration for SPS of uplink transmissions by the UEs and transmit a group feedback signal to the group of UEs on resources specified by the configuration, the group feedback signal being based on the failure to decode the message. In other circumstances, the transmission component 920 may transmit a multicast broadcast transmission to a group of UEs and re-transmit the multicast broadcast transmission to at least a subset of the group of UEs based on receipt of the feedback signal.

The process component 925 may fail to decode a message that one of the UEs attempted to transmit to the base station in accordance with the configuration. In some examples, the process component 925 may properly decode a re-transmission.

The receiving component 930 may receive a re-transmitted message from the one of the UEs, re-transmission of the message being based on the group feedback signal. In other instances, the receiving component 930 may receive a feedback signal from at least one of the UEs, the feedback signal indicating that the UE did not decode the multicast broadcast transmission.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
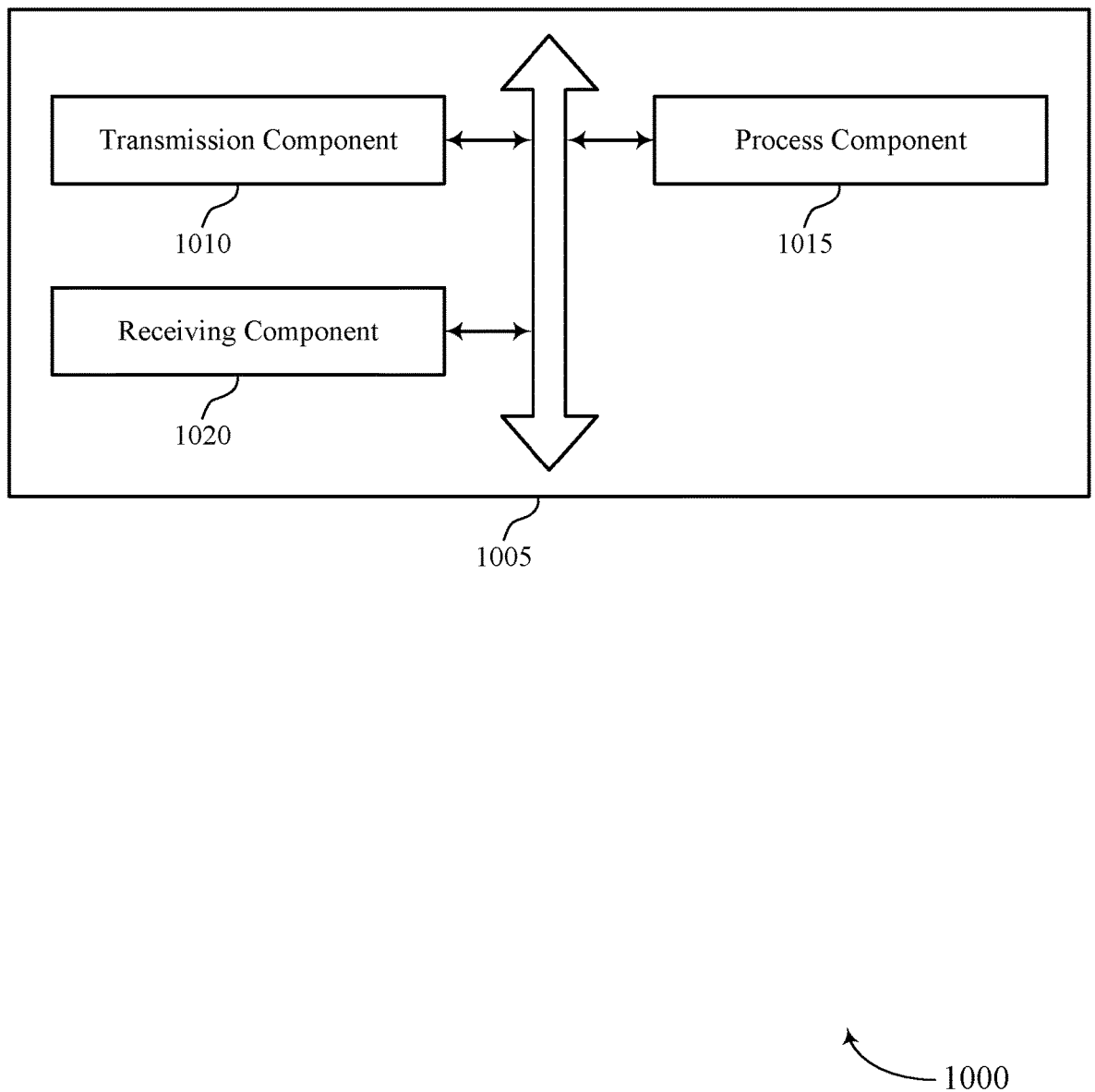
FIG. 10 shows a block diagram of a communications manager that supports group signaling for URLLC in accordance with aspects of the present disclosure.

FIG. 10 shows a block diagram 1000 of a communications manager 1005 that supports group signaling for URLLC in accordance with aspects of the present disclosure.

The communications manager 1005 may be an example of aspects of a communications manager 815, a communications manager 915, or a communications manager 1110 described herein. The communications manager 1005 may include a transmission component 1010, a process component 1015, and a receiving component 1020. Each of these modules may communicate, directly or indirectly, with one another (e.g., via one or more buses).

The transmission component 1010 may transmit, to a group of UEs, a configuration for SPS of uplink transmissions by the UEs. In some examples, the transmission component 1010 may transmit a group feedback signal to the group of UEs on resources specified by the configuration, the group feedback signal being based on the failure to decode the message.

In some examples, the transmission component 1010 may transmit a multicast broadcast transmission to a group of UEs. In some examples, the transmission component 1010 may re-transmit the multicast broadcast transmission to at least a subset of the group of UEs based on receipt of the feedback signal.

The process component 1015 may fail to decode a message that one of the UEs attempted to transmit to the base station in accordance with the configuration. In some examples, the process component 1015 may properly decode a re-transmission.

The receiving component 1020 may receive a re-transmitted message from the one of the UEs, re-transmission of the message being based on the group feedback signal. In some examples, the receiving component 1020 may receive a feedback signal from at least one of the UEs, the feedback signal indicating that the UE did not decode the multicast broadcast transmission.

Figure 11:
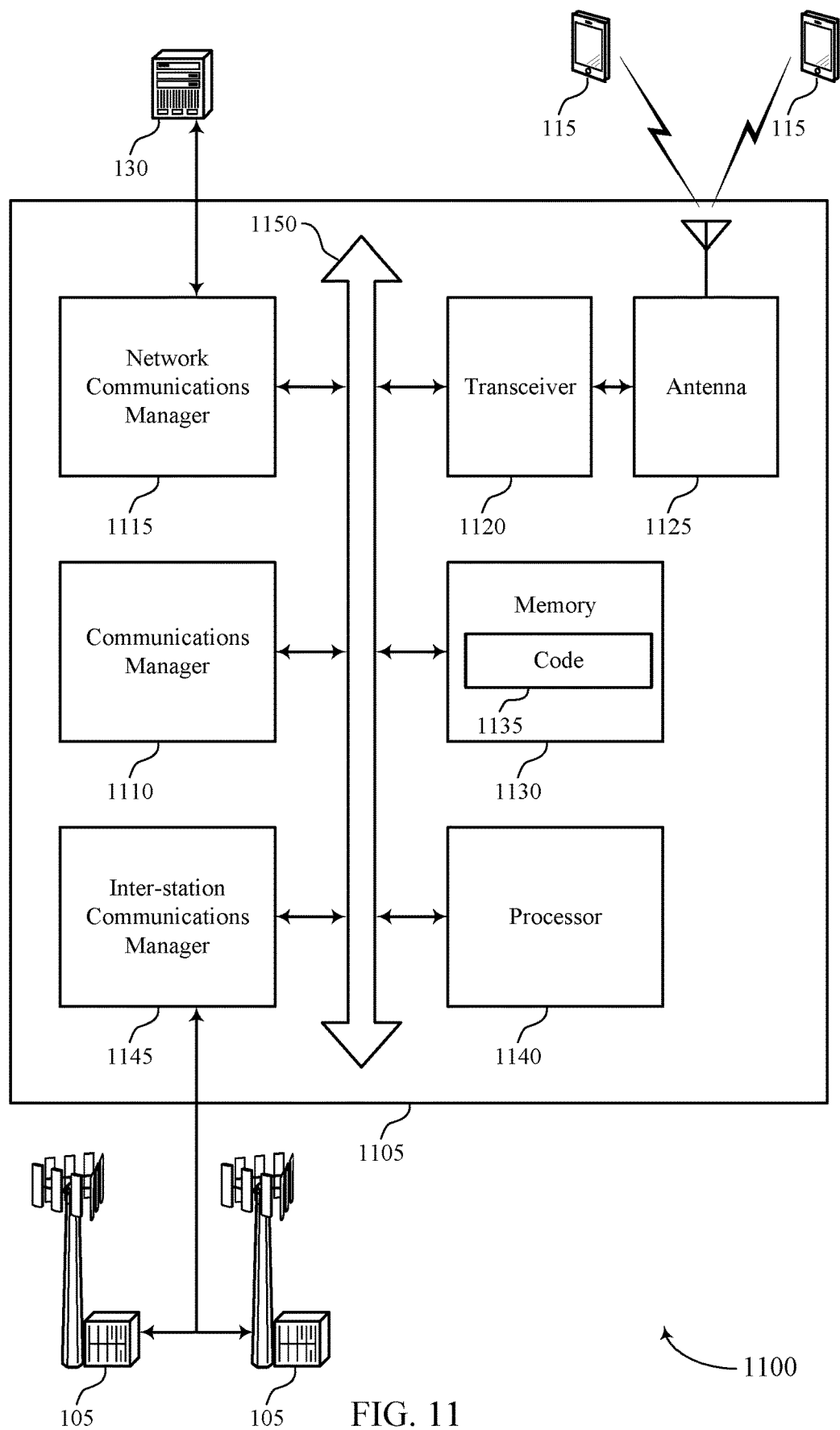
FIG. 11 shows a diagram of a system including a device that supports group signaling for URLLC in accordance with aspects of the present disclosure.

FIG. 11 shows a diagram of a system 1100 including a device 1105 that supports group signaling for URLLC in accordance with aspects of the present disclosure. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communications manager 1110 may transmit, to a group of UEs, a configuration for SPS of uplink transmissions by the UEs. The communications manager 1110 may fail to decode a message that one of the UEs attempted to transmit to the base station in accordance with the configuration and transmit a group feedback signal to the group of UEs on resources specified by the configuration, the group feedback signal being based on the failure to decode the message. The communications manager 1110 may receive a re-transmitted message from the one of the UEs, re-transmission of the message being based on the group feedback signal. The communications manager 1110 may also transmit a multicast broadcast transmission to a group of UEs, re-transmit the multicast broadcast transmission to at least a subset of the group of UEs based on receipt of the feedback signal, and receive a feedback signal from at least one of the UEs, the feedback signal indicating that the UE did not decode the multicast broadcast transmission.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the device 1105 may include a single antenna 1125. However, in some cases the device 1105 may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device 1105 to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device to perform various functions (e.g., functions or tasks supporting group signaling for URLLC).

The inter-station communications manager 1145 may manage communications with other base stations 105, and may include a controller or scheduler for controlling communications with UEs 115 in cooperation with the other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between the base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
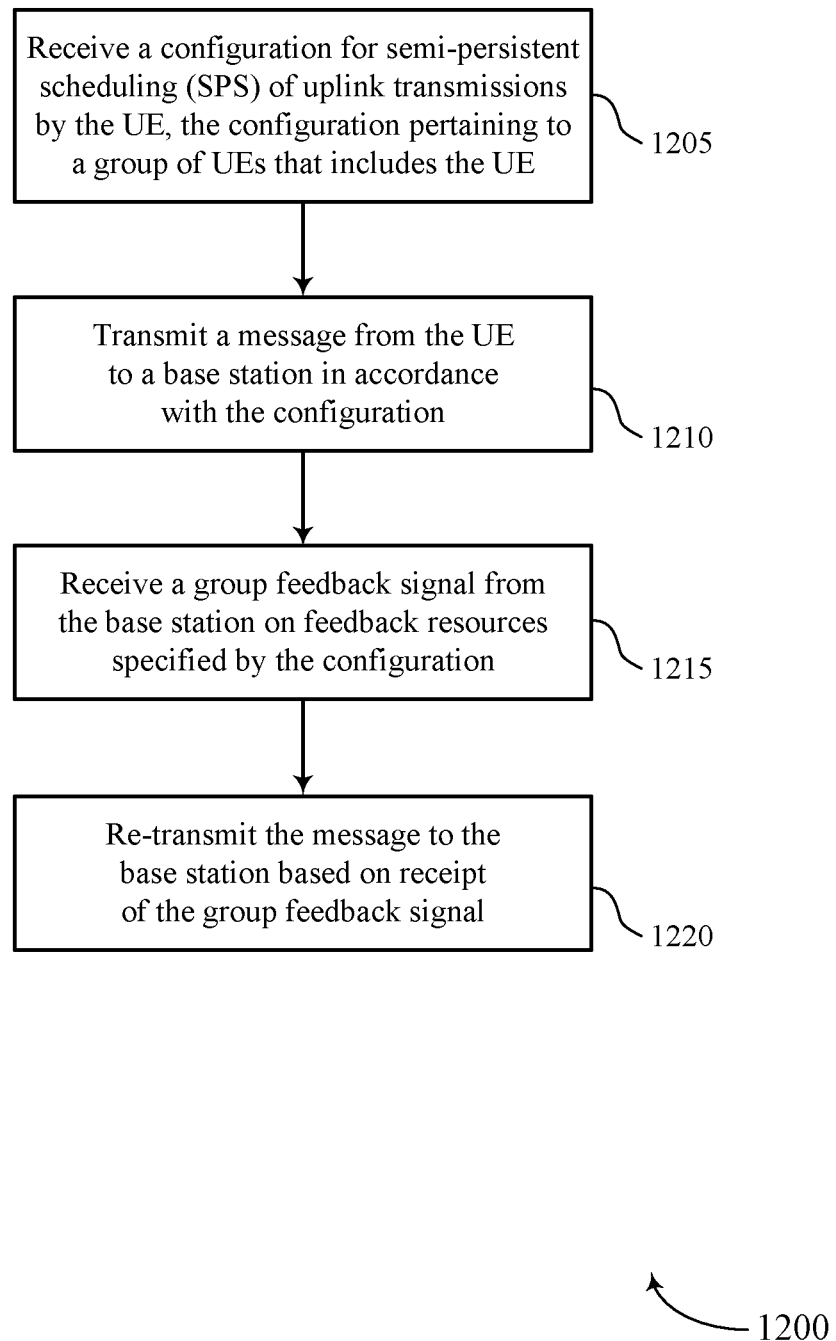
FIGS. 12 through 15 show flowcharts illustrating methods that support group signaling for URLLC in accordance with aspects of the present disclosure.

FIG. 12 shows a flowchart illustrating a method 1200 that supports group signaling for URLLC in accordance with aspects of the present disclosure. The operations of method 1200 may be implemented by a UE 115 or its components as described herein. For example, the operations of method 1200 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1205, the UE may receive a configuration for SPS of uplink transmissions by the UE, the configuration pertaining to a group of UEs that includes the UE. The operations of 1205 may be performed according to the methods described herein. In some examples, aspects of the operations of 1205 may be performed by a receiving component as described with reference to FIGS. 4 through 7.

At 1210, the UE may transmit a message from the UE to a base station in accordance with the configuration. The operations of 1210 may be performed according to the methods described herein. In some examples, aspects of the operations of 1210 may be performed by a transmission component as described with reference to FIGS. 4 through 7.

At 1215, the UE may receive a group feedback signal from the base station on feedback resources specified by the configuration. The operations of 1215 may be performed according to the methods described herein. In some examples, aspects of the operations of 1215 may be performed by a receiving component as described with reference to FIGS. 4 through 7.

At 1220, the UE may re-transmit the message to the base station based on receipt of the group feedback signal. The operations of 1220 may be performed according to the methods described herein. In some examples, aspects of the operations of 1220 may be performed by a transmission component as described with reference to FIGS. 4 through 7.

Figure 13:
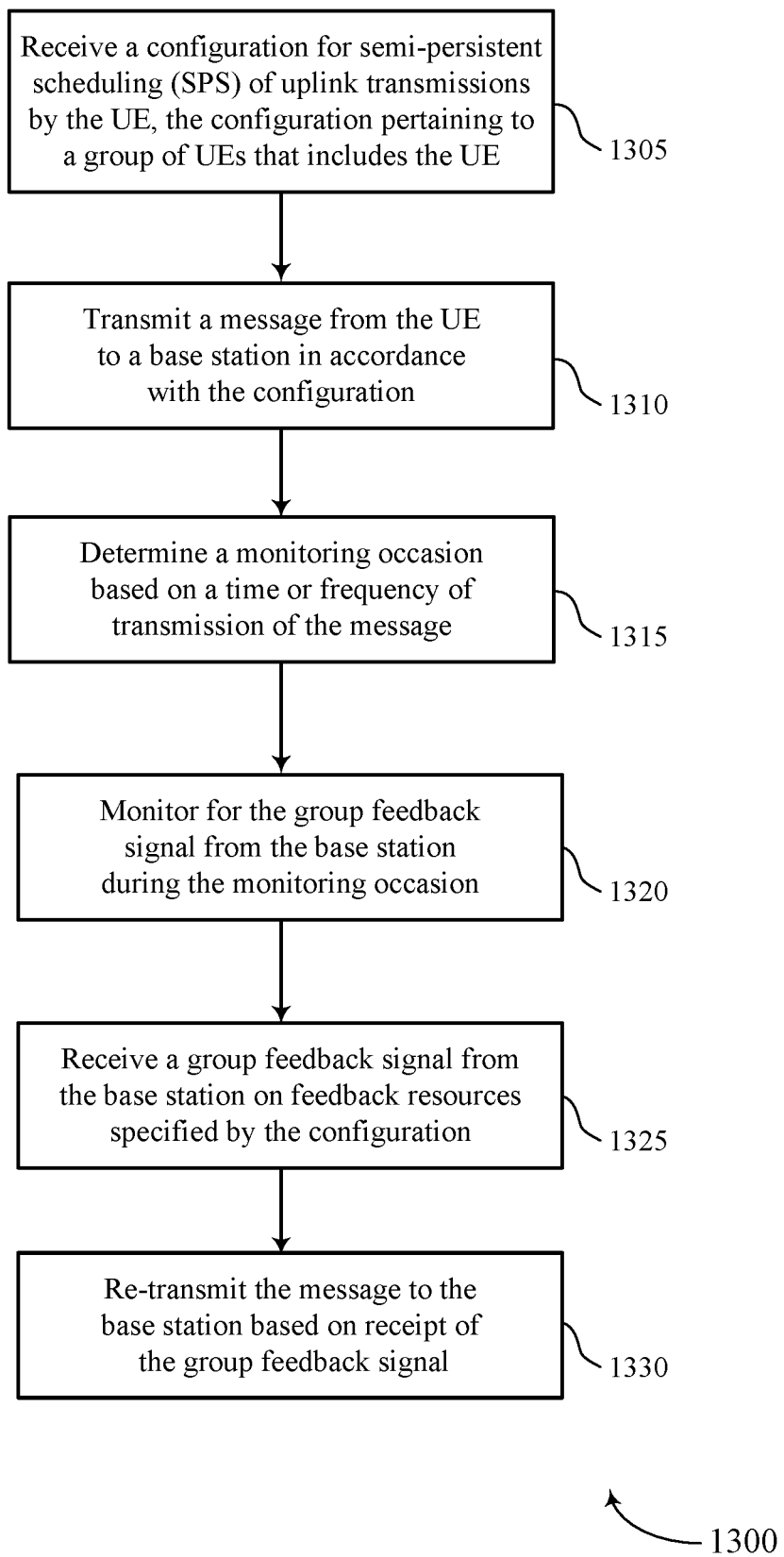

FIG. 13 shows a flowchart illustrating a method 1300 that supports group signaling for URLLC in accordance with aspects of the present disclosure. The operations of method 1300 may be implemented by a UE 115 or its components as described herein. For example, the operations of method 1300 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1305, the UE may receive a configuration for SPS of uplink transmissions by the UE, the configuration pertaining to a group of UEs that includes the UE. The operations of 1305 may be performed according to the methods described herein. In some examples, aspects of the operations of 1305 may be performed by a receiving component as described with reference to FIGS. 4 through 7.

At 1310, the UE may transmit a message from the UE to a base station in accordance with the configuration. The operations of 1310 may be performed according to the methods described herein. In some examples, aspects of the operations of 1310 may be performed by a transmission component as described with reference to FIGS. 4 through 7.

At 1315, the UE may determine a monitoring occasion based on a time or frequency of transmission of the message. The operations of 1315 may be performed according to the methods described herein. In some examples, aspects of the operations of 1315 may be performed by a process component as described with reference to FIGS. 4 through 7.

At 1320, the UE may monitor for the group feedback signal from the base station during the monitoring occasion. The operations of 1320 may be performed according to the methods described herein. In some examples, aspects of the operations of 1320 may be performed by a monitoring component as described with reference to FIGS. 4 through 7.

At 1325, the UE may receive a group feedback signal from the base station on feedback resources specified by the configuration. The operations of 1325 may be performed according to the methods described herein. In some examples, aspects of the operations of 1325 may be performed by a receiving component as described with reference to FIGS. 4 through 7.

At 1330, the UE may re-transmit the message to the base station based on receipt of the group feedback signal. The operations of 1330 may be performed according to the methods described herein. In some examples, aspects of the operations of 1330 may be performed by a transmission component as described with reference to FIGS. 4 through 7.

Figure 14:
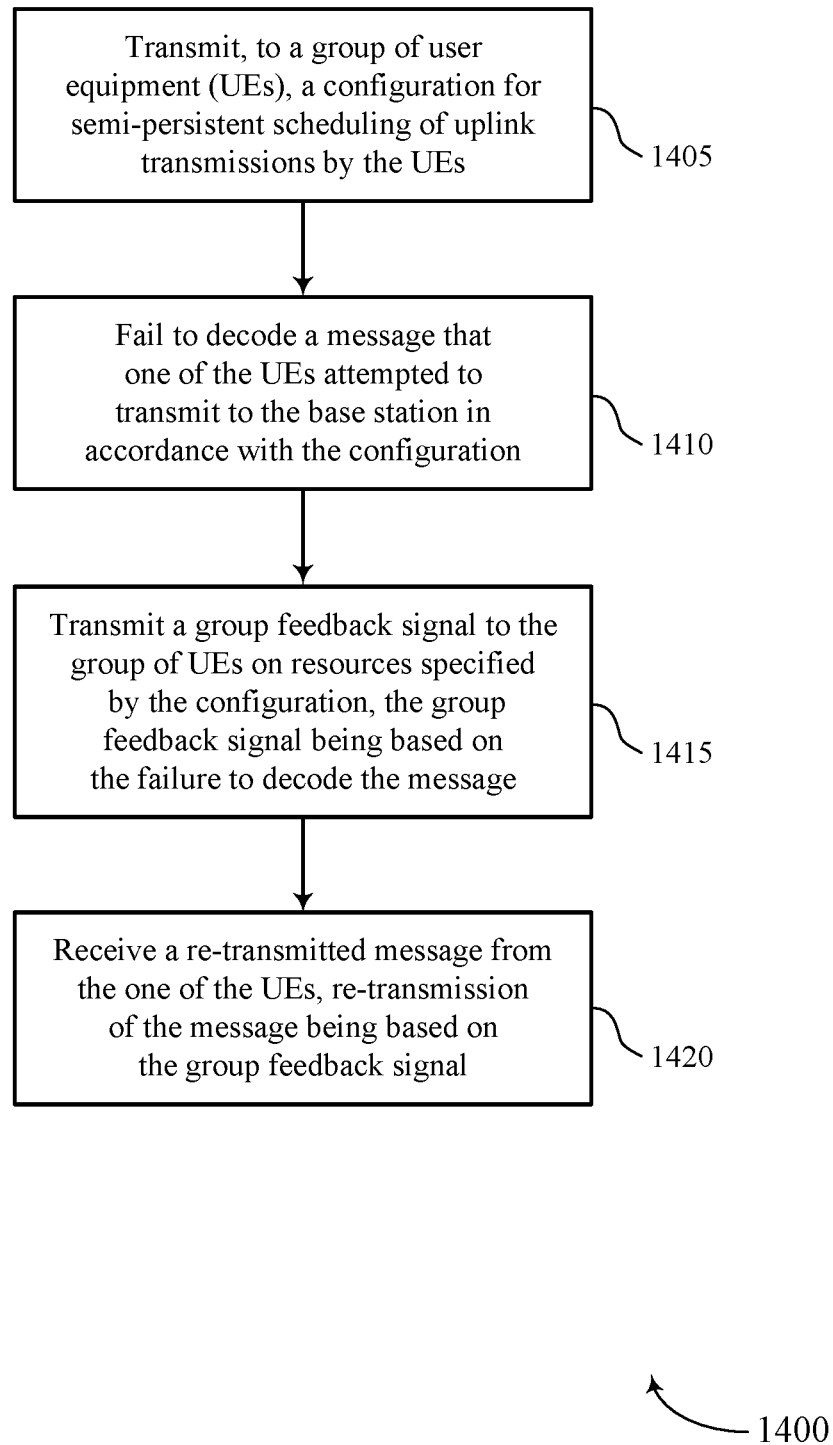

FIG. 14 shows a flowchart illustrating a method 1400 that supports group signaling for URLLC in accordance with aspects of the present disclosure. The operations of method 1400 may be implemented by a base station 105 or its components as described herein. For example, the operations of method 1400 may be performed by a communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1405, the base station may transmit, to a group of UEs, a configuration for SPS of uplink transmissions by the UEs. The operations of 1405 may be performed according to the methods described herein. In some examples, aspects of the operations of 1405 may be performed by a transmission component as described with reference to FIGS. 8 through 11.

At 1410, the base station may fail to decode a message that one of the UEs attempted to transmit to the base station in accordance with the configuration. The operations of 1410 may be performed according to the methods described herein. In some examples, aspects of the operations of 1410 may be performed by a process component as described with reference to FIGS. 8 through 11.

At 1415, the base station may transmit a group feedback signal to the group of UEs on resources specified by the configuration, the group feedback signal being based on the failure to decode the message. The operations of 1415 may be performed according to the methods described herein. In some examples, aspects of the operations of 1415 may be performed by a transmission component as described with reference to FIGS. 8 through 11.

At 1420, the base station may receive a re-transmitted message from the one of the UEs, re-transmission of the message being based on the group feedback signal. The operations of 1420 may be performed according to the methods described herein. In some examples, aspects of the operations of 1420 may be performed by a receiving component as described with reference to FIGS. 8 through 11.

Figure 15:
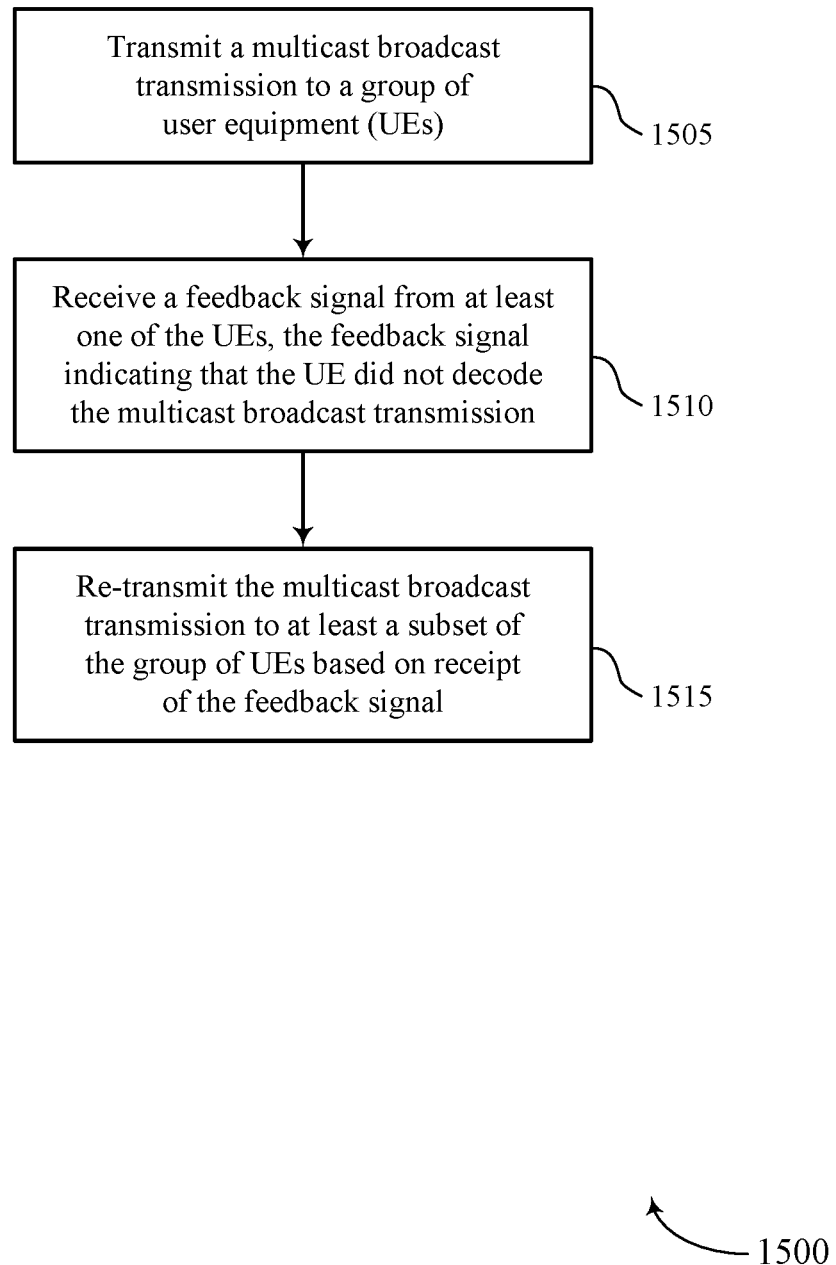

FIG. 15 shows a flowchart illustrating a method 1500 that supports group signaling for URLLC in accordance with aspects of the present disclosure. The operations of method 1500 may be implemented by a base station 105 or its components as described herein. For example, the operations of method 1500 may be performed by a communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1505, the base station may transmit a multicast broadcast transmission to a group of UEs. The operations of 1505 may be performed according to the methods described herein. In some examples, aspects of the operations of 1505 may be performed by a transmission component as described with reference to FIGS. 8 through 11.

At 1510, the base station may receive a feedback signal from at least one of the UEs, the feedback signal indicating that the UE did not decode the multicast broadcast transmission. The operations of 1510 may be performed according to the methods described herein. In some examples, aspects of the operations of 1510 may be performed by a receiving component as described with reference to FIGS. 8 through 11.

At 1515, the base station may re-transmit the multicast broadcast transmission to at least a subset of the group of UEs based on receipt of the feedback signal. The operations of 1515 may be performed according to the methods described herein. In some examples, aspects of the operations of 1515 may be performed by a transmission component as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UNITS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving a configuration for semi-persistent scheduling (SPS) of uplink transmissions by the UE, the configuration pertaining to a group of UEs that includes the UE, wherein the configuration includes an indication associated with a monitoring occasion for a group feedback signal;
   transmitting a message from the UE to a base station in accordance with the configuration, wherein the message is transmitted using uplink repetition during a repetition window;
   receiving the group feedback signal from the base station on feedback resources specified by the configuration, wherein the feedback resource is a resource associated with a last transmission time interval (TTI) in the repetition window; and
   re-transmitting the message to the base station based at least in part on receipt of the group feedback signal.

2. The method of claim 1, further comprising:
   determining the monitoring occasion from the indication associated with the monitoring occasion and based at least in part on a time or frequency of transmission of the message; and
   monitoring for the group feedback signal from the base station during the monitoring occasion.

3. The method of claim 2, wherein
   the indication associated with the monitoring occasion is associated with a timing of the monitoring occasion.

4. The method of claim 1, wherein the group feedback signal pertains to UEs of the group of UEs that are configured to transmit using a same resource of a specific in accordance with the configuration, wherein the specific TTI is the last TTI of the repetition window.

5. The method of claim 1, wherein the group feedback signal pertains to UEs of the group of UEs that are configured to transmit during a specific TTI in accordance with the configuration, wherein the specific TTI is the last TTI of the repetition window.

6. The method of claim 1, wherein the group feedback signal pertains to UEs of the group of UEs that are configured to transmit during a specific TTI and to use a specific sub-band in accordance with the configuration, wherein the specific TTI is the last TTI of the repetition window.

7. The method of claim 1, wherein the group feedback signal pertains to UEs of the group of UEs that are configured to transmit during a specific portion of a TTI and to use a specific sub-band in accordance with the configuration, wherein the specific TTI is the last TTI of the repetition window.

8. The method of claim 1, wherein transmitting the message from the UE to the base station comprises:
transmitting the message as an initial transmission.

9. The method of claim 1, wherein receiving the group feedback signal further comprises:
receiving the group feedback signal over a resource associated with a frequency resource in the repetition window such that the group feedback signal pertains to the entire repetition window.

10. The method of claim 1, wherein the group feedback signal includes individual group feedback indicators for each transmission in the repetition window.

11. The method of claim 1, wherein re-transmitting the message to the base station further comprises:
re-transmitting a transport block (TB) of the message as part of an associated hybrid automatic repeat request acknowledgement (HARQ) process.

12. The method of claim 1, wherein re-transmitting the message to the base station further comprises:
re-transmitting the message using next available SPS resources after a specified gap in time, in accordance with the configuration.

13. The method of claim 12, wherein the specified gap in time is specified for the UE or for the group of UEs.

14. The method of claim 1, wherein re-transmitting the message to the base station further comprises:
re-transmitting the message using re-transmission resources specified by the configuration.

15. The method of claim 1, wherein the group feedback signal is only received as a negative acknowledgement signal.

16. A method for wireless communication at a base station, comprising:
transmitting, to a group of user equipment (UEs), a configuration for semi-persistent scheduling (SPS) of uplink transmissions by the UEs, wherein the configuration includes a timing indication associated with a monitoring occasion for a group feedback signal;
failing to decode a message that one of the UEs attempted to transmit to the base station in accordance with the configuration, wherein the message was transmitted using uplink repetition during a repetition window;
transmitting the group feedback signal to the group of UEs on resources specified by the configuration, the group feedback signal being based at least in part on the failure to decode the message, and wherein the resources include a resource associated with a last transmission time interval (TTI) in the repetition window; and
receiving a re-transmitted message from the one of the UEs, re-transmission of the message being based at least in part on the group feedback signal.

17. The method of claim 16,
wherein the monitoring occasion is further based at least in part on a time or frequency of transmission of the message by the one of the UEs.

18. The method of claim 16, wherein the group feedback signal pertains to UEs of the group of UEs that are configured to transmit using a same resource of a specific TTI in accordance with the configuration, wherein the specific TTI is the last TTI of the repetition window.

19. The method of claim 16, wherein the group feedback signal pertains to UEs of the group of UEs that are configured to transmit during a specific TTI in accordance with the configuration, wherein the specific TTI is the last TTI of the repetition window.

20. The method of claim 16, wherein the group feedback signal pertains to UEs of the group of UEs that are configured to transmit during a specific transmission time interval (TTI) and to use a specific sub-band in accordance with the configuration.

21. The method of claim 16, wherein the group feedback signal pertains to UEs of the group of UEs that are configured to transmit during a specific portion of a TTI and to use a specific sub-band in accordance with the configuration, wherein the specific TTI is the last TTI of the repetition window.

22. The method of claim 16, wherein transmitting the group feedback signal to the group of UEs on resources specified by the configuration comprises:
identifying that uplink repetition is enabled for the UEs; and
transmitting the group feedback signal over a resource associated with a frequency resource in the repetition window associated with the uplink repetition such that the group feedback signal pertains to the entire repetition window.

23. The method of claim 16, wherein
the group feedback signal includes individual group feedback indicators for each transmission in the repetition window.

24. The method of claim 16, wherein receiving the re-transmitted message from the one of the UEs further comprises:
receiving the re-transmitted message via next available SPS resources after a specified gap in time, in accordance with the configuration.

25. The method of claim 24, further comprising:
indicating the specified gap in time as a UE-specific gap in time or as a group-specific gap in time.

26. The method of claim 16, wherein receiving the re-transmitted message from the one of the UEs further comprises:
receiving the re-transmitted message via re-transmission resources specified by the configuration.

27. The method of claim 16, wherein transmitting the group feedback signal to the group of UEs comprises:
transmitting the group feedback signal to the group of UEs only if the group feedback signal is a negative acknowledgement signal.

28. The method of claim 16, wherein transmitting the group feedback signal to the group of UEs comprises:
transmitting the group feedback signal on resources that overlap with other transmissions to other UEs.

29. The method of claim 28, further comprising:

rate-matching the transmissions to other UEs around resources used for transmission of the group feedback signal.

30. The method of claim 29, wherein the group feedback signal transmission resources are covered by zero-power channel state information reference signal (ZP-CSI-RS) resources.

31. The method of claim 29, further comprising:
configuring the other UEs with resources for the group feedback signal so that the other UEs are enabled to rate-match around the resources for the group feedback signal.

32. The method of claim 28, further comprising:
puncturing the transmissions to other UEs that are utilizing transmission resources of the group feedback signal.

33. A method for wireless communication at a base station, comprising:
transmitting a multicast broadcast transmission to a group of user equipment (UEs) that are group-configured to transmit a feedback signal according to a group configuration;
receiving the feedback signal from at least one of the UEs, the feedback signal indicating that the UE did not decode the multicast broadcast transmission; and
re-transmitting the multicast broadcast transmission to at least a subset of the group of UEs based at least in part on receipt of the feedback signal, wherein the subset of the UEs are configured to transmit the feedback signal during a last transmission time interval (TTI) in a repetition window in accordance with the group configuration.

34. The method of claim 33, wherein the base station re-transmits the multicast broadcast transmission to UEs of the group of UEs that are configured to transmit the feedback signal using a same resource of the last TTI.

35. The method of claim 33, wherein the base station re-transmits the multicast broadcast transmission to UEs of the group of UEs that are configured to use a specific sub-band in accordance with the group configuration.

36. The method of claim 33, wherein the base station re-transmits the multicast broadcast transmission to UEs of the group of UEs that are configured to transmit the feedback signal during a specific portion of the last TTI and to use a specific sub-band in accordance with the group configuration.

37. The method of claim 33, wherein receiving the feedback signal comprises:
receiving the feedback signal from more than one UE on a given physical uplink control channel or a group of physical uplink control channels.

38. The method of claim 33, wherein the feedback signal is only received as a negative acknowledgement signal.

39. An apparatus for wireless communication at a user equipment (UE), comprising:
a processor;
memory in electronic communication with the processor; and
instructions stored in the memory and executable by the processor to cause the apparatus to:
receive a configuration for semi-persistent scheduling (SPS) of uplink transmissions by the UE, the configuration pertaining to a group of UEs that includes the UE, wherein the configuration includes an indication associated with a monitoring occasion for a group feedback signal;
transmit a message from the UE to a base station in accordance with the configuration, wherein the message is transmitted using uplink repetition during a repetition window;
receive the group feedback signal from the base station on feedback resources specified by the configuration, wherein the feedback resource is a resource associated with a last transmission time interval (TTI) in the repetition window; and
re-transmit the message to the base station based at least in part on receipt of the group feedback signal.

40. The apparatus of claim 39, wherein the instructions are further executable by the processor to cause the apparatus to:
determine the monitoring occasion from the indication associated with the monitoring occasion and based at least in part on a time or frequency of transmission of the message; and
monitor for the group feedback signal from the base station during the monitoring occasion.

41. The apparatus of claim 39, wherein transmitting the message from the UE to the base station comprise transmitting the message as an initial transmission.

42. The apparatus of claim 39, wherein the instructions to receive the group feedback signal are executable by the processor to cause the apparatus to:
receive the group feedback signal over a resource associated with a frequency resource in the repetition window such that the group feedback signal pertains to the entire repetition window.

43. The apparatus of claim 39, wherein
the group feedback signal includes individual group feedback indicators for each transmission in the repetition window.

44. An apparatus for wireless communication at a base station, comprising:
a processor;
memory in electronic communication with the processor; and
instructions stored in the memory and executable by the processor to cause the apparatus to:
transmit, to a group of user equipment (UEs), a configuration for semi-persistent (SPS) scheduling of uplink transmissions by the UEs, wherein the configuration includes a timing indication associated with a monitoring occasion for a group feedback signal;
fail to decode a message that one of the UEs attempted to transmit to the base station in accordance with the configuration, wherein the message was transmitted using uplink repetition during a repetition window;
transmit the group feedback signal to the group of UEs on resources specified by the configuration, the group feedback signal being based at least in part on the failure to decode the message, and wherein the resources include a resource associated with a last transmission time interval (TTI) in the repetition window; and
receive a re-transmitted message from the one of the UEs, re-transmission of the message being based at least in part on the group feedback signal.

45. The apparatus of claim 44, wherein
the monitoring occasion is based at least in part on a time or frequency of transmission of the message by the one of the UEs.

46. An apparatus for wireless communication at a base station, comprising:

a processor;
memory in electronic communication with the processor; and
instructions stored in the memory and executable by the processor to cause the apparatus to:
  transmit a multicast broadcast transmission to a group of user equipment (UEs) that are group-configured to transmit a feedback signal according to a group configuration;
  receive the feedback signal from at least one of the UEs, the feedback signal indicating that the UE did not decode the multicast broadcast transmission; and
  re-transmit the multicast broadcast transmission to at least a subset of the group of UEs based at least in part on receipt of the feedback signal, wherein the subset of the UEs are configured to transmit the feedback signal during a last transmission time interval (TTI) in a repetition window in accordance with the group configuration.

47. An apparatus for wireless communication at a user equipment (UE), comprising:
  means for receiving a configuration for semi-persistent scheduling (SPS) of uplink transmissions by the UE, the configuration pertaining to a group of UEs that includes the UE, wherein the configuration includes an indication associated with a monitoring occasion for a group feedback signal;
  means for transmitting a message from the UE to a base station in accordance with the configuration, wherein the message is transmitted using uplink repetition during a repetition window;
  means for receiving the group feedback signal from the base station on feedback resources specified by the configuration, wherein the feedback resource is a resource associated with a last transmission time interval (TTI) in the repetition window; and
  means for re-transmitting the message to the base station based at least in part on receipt of the group feedback signal.

48. An apparatus for wireless communication at a base station, comprising:
  means for transmitting, to a group of user equipment (UEs), a configuration for semi-persistent scheduling (SPS) of uplink transmissions by the UEs, wherein the configuration includes a timing indication associated with a monitoring occasion for a group feedback signal;
  means for failing to decode a message that one of the UEs attempted to transmit to the base station in accordance with the configuration, wherein the message was transmitted using uplink repetition during a repetition window;
  means for transmitting the group feedback signal to the group of UEs on resources specified by the configuration, the group feedback signal being based at least in part on the failure to decode the message, and wherein the resources include a resource associated with a last transmission time interval (TTI) in the repetition window; and
  means for receiving a re-transmitted message from the one of the UEs, re-transmission of the message being based at least in part on the group feedback signal.

49. An apparatus for wireless communication at a base station, comprising:
  means for transmitting a multicast broadcast transmission to a group of user equipment (UEs) that are group-configured to transmit a feedback signal according to a group configuration;
  means for receiving the feedback signal from at least one of the UEs, the feedback signal indicating that the UE did not decode the multicast broadcast transmission; and
  means for re-transmitting the multicast broadcast transmission to at least a subset of the group of UEs based at least in part on receipt of the feedback signal, wherein the subset of the UEs are configured to transmit the feedback signal during a last transmission time interval (TTI) in a repetition window in accordance with the group configuration.

50. A non-transitory computer-readable medium storing code for wireless communication at a user equipment (UE), the code comprising instructions executable by a processor to:
  receive a configuration for semi-persistent scheduling (SPS) of uplink transmissions by the UE, the configuration pertaining to a group of UEs that includes the UE, wherein the configuration includes an indication associated with a monitoring occasion for a group feedback signal;
  transmit a message from the UE to a base station in accordance with the configuration, wherein the message is transmitted using uplink repetition during a repetition window;
  receive the group feedback signal from the base station on feedback resources specified by the configuration, wherein the feedback resource is a resource associated with a last transmission time interval (TTI) in the repetition window; and
  re-transmit the message to the base station based at least in part on receipt of the group feedback signal.

51. A non-transitory computer-readable medium storing code for wireless communication at a base station, the code comprising instructions executable by a processor to:
  transmit, to a group of user equipment (UEs), a configuration for semi-persistent scheduling (SPS) of uplink transmissions by the UEs, wherein the configuration includes a timing indication associated with a monitoring occasion for a group feedback signal;
  fail to decode a message that one of the UEs attempted to transmit to the base station in accordance with the configuration, wherein the message was transmitted using uplink repetition during a repetition window;
  transmit the group feedback signal to the group of UEs on resources specified by the configuration, the group feedback signal being based at least in part on the failure to decode the message, and wherein the resources include a resource associated with a last transmission time interval (TTI) in the repetition window; and
  receive a re-transmitted message from the one of the UEs, re-transmission of the message being based at least in part on the group feedback signal.

52. A non-transitory computer-readable medium storing code for wireless communication at a base station, the code comprising instructions executable by a processor to:
  transmit a multicast broadcast transmission to a group of user equipment (UEs) that are group-configured to transmit a feedback signal according to a group configuration;
  receive the feedback signal from at least one of the UEs, the feedback signal indicating that the UE did not decode the multicast broadcast transmission; and
  re-transmit the multicast broadcast transmission to at least a subset of the group of UEs based at least in part on receipt of the feedback signal, wherein the subset of the UEs are configured to transmit the feedback signal during a last transmission time interval (TTI) in a repetition window in accordance with the group configuration.

\* \* \* \* \*